US012579644B2

(12) United States Patent　　　　(10) Patent No.:　US 12,579,644 B2
Halder et al.　　　　　　　　　　　(45) Date of Patent:　Mar. 17, 2026

(54) MECHANICS-INFORMED QUANTITATIVE FLOW ANALYSIS OF MEDICAL IMAGES OF A TUBULAR ORGAN

(71) Applicant: Northwestern University, Evanston, IL (US)

(72) Inventors: Sourav Halder, Evanston, IL (US); Ethan M. Johnson, Evanston, IL (US); Jun Yamasaki, Evanston, IL (US); Peter J. Kahrilas, Evanston, IL (US); Michael Markl, Evanston, IL (US); John Erik Pandolfino, Evanston, IL (US); Neelesh A. Patankar, Evanston, IL (US)

(73) Assignee: Northwestern University, Evanston, IL (US)

( * ) Notice: Subject to any disclaimer, the term of this patent is extended or adjusted under 35 U.S.C. 154(b) by 411 days.

(21) Appl. No.: 18/446,925

(22) Filed: Aug. 9, 2023

(65) Prior Publication Data

US 2024/0062370 A1　　Feb. 22, 2024

Related U.S. Application Data

(60) Provisional application No. 63/371,010, filed on Aug. 10, 2022.

(51) Int. Cl.
*G06T 7/00*　　　(2017.01)
*G06T 7/11*　　　(2017.01)
(52) U.S. Cl.
CPC ............. *G06T 7/0012* (2013.01); *G06T 7/11* (2017.01); *G06T 2207/20081* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 2015/0038805 | A1* | 2/2015 | Bhargava | A61B 5/4205 |
| | | | | 600/593 |
| 2022/0383500 | A1* | 12/2022 | Galeotti | G06T 7/20 |
| 2025/0017560 | A1* | 1/2025 | Kusu | A61B 5/7289 |

FOREIGN PATENT DOCUMENTS

| | | | | | |
|---|---|---|---|---|---|
| WO | WO-2021102436 | A1 * | 5/2021 | .......... | G06V 10/454 |
| WO | 2021102205 | A1 | 11/2021 | | |
| WO | WO-2022093477 | A1 * | 5/2022 | .......... | A61B 5/4233 |

OTHER PUBLICATIONS

H. B. El-Serag, S. Sweet, C. C. Winchester, J. Dent, Update on the epidemiology of gastro-oesophageal reflux disease: a systematic review, Gut 63 (6) (2014) 871-880.

(Continued)

*Primary Examiner* — Thomas D Lee
(74) *Attorney, Agent, or Firm* — Quarles & Brady LLP

(57)　　　　ABSTRACT

Esophageal bolus transport and esophageal mechanics are quantified from medical imaging data, such as dynamic magnetic resonance imaging ("MRI") data, computed tomography ("CT") data, or the like. A machine learning model is used to process geometric or other spatiotemporal parameters of a bolus imaged with medical imaging in order to estimate quantitative parameters of the bolus and/or esophagus, such as cross-sectional area, fluid velocity, and fluid pressure. From these values, other parameters can be computed, such as esophageal stiffness and active relaxation.

14 Claims, 11 Drawing Sheets

(56)         References Cited

OTHER PUBLICATIONS

T. Yamasaki, C. Hemond, M. Eisa, S. Ganocy, R. Fass, The changing epidemiology of gastroesophageal reflux disease: Are patients getting younger?, Journal of neurogastroenterology and motility 24 (4) (2018) 559-569.
N. Bhattacharyya, The prevalence of dysphagia among adults in the united states, Otolaryngology—Head and Neck Surgery 151 (5) (2014) 765-769.
M. Fox, G. Hebbard, P. Janiak, J. G. Brasseur, S. Ghosh, M. Thumshirn, M. Fried, W. Schwizer, High-resolution manometry predicts the success of oesophageal bolus transport and identifies clinically important abnormalities not detected by conventional manometry, Neurogastroenterology and motility: the official journal of the European Gastrointestinal Motility Society 16 (5) (2004) 533-542.
P. Je, K. H, G. SK, C. JO, Z. Q, K. PJ, High-resolution manometry of the egj: an analysis of crural diaphragm function in gerd, The American journal of gastroenterology 102 (5) (2007) 1056-1063.
P. JE, K. MA, N. T, B. W, P. J, K. PJ., Achalasia: a new clinically relevant classification by high-resolution manometry, Gastroenterology135 (5) (2008) 1526-1533.
M. R. Fox, A. J. Bredenoord, Oesophageal high-resolution manometry: moving from research into clinical practice, Gut 57 (3) (2008) 405-423.
J. E. Pandolfino, M. R. Fox, A. J. Bredenoord, P. J. Kahrilas, High-resolution manometry in clinical practice: utilizing pressure topography to classify oesophageal motility abnormalities, Neurogastroenterology & Motility 21 (8) (2009) 796-806.
C. P. Gyawali, A. J. Bredenoord, J. L. Conklin, M. Fox, J. E. Pandolfino, J. H. Peters, S. Roman, A. Staiano, M. F. Vaezi, Evaluation of esophageal motor function in clinical practice, Neurogastroenterology & Motility 25 (2) (2013) 99-133.
D. A. Carlson, P. J. Kahrilas, Z. Lin, I. Hirano, N. Gonsalves, Z. Listernick, K. Ritter, M. Tye, F. A. Ponds, I. Wong, J. E. Pandolfino, Evaluation of esophageal motility utilizing the functional lumen imaging probe., The American journal of gastroenterology 111 (12) (2016) 1726--1735.
R. Yadlapati, P. J. Kahrilas, M. R. Fox, A. J. Bredenoord, C. Prakash Gyawali, S. Roman, A. Babaei, R. K. Mittal, N. Rommel, E. Savarino, D. Sifrim, A. Smout, M. F. Vaezi, F. Zerbib, J. Akiyama, S. Bhatia, S. Bor, D. A. Carlson, J. W. Chen, D. Cisternas, C. Cock, E. Coss-Adame, N. de Bortoli, C. Defilippi, R. Fass, U. C. Ghoshal, S. Gonlachanvit, A. Hani, G. S. Hebbard, K. Wook Jung, P. Katz, D. A. Katzka, A. Khan, G. P. Kohn, A. Lazarescu, J. Lengliner, S. K. Mittal, T. Omari, M. I. Park, R. Penagini, D. Pohl, J. E. Richter, J. Serra, R. Sweis, J. Tack, R. P. Tatum, R. Tutuian, M.
Y. Fan, H. Gregersen, G. Kassab, A two-layered mechanical model of the rat esophagus. experiment and theory, BioMedical Engineering OnLine 3 (2004).
W. Yang, T. C. Fung, K. S. Chian, C. K. Chong, 3D Mechanical Properties of the Layered Esophagus: Experiment and Constitutive Model, Journal of Biomechanical Engineering 128 (6) (2006) 899-908.
A. N. Natali, E. L. Carniel, H. Gregersen, Biomechanical behaviour of oesophageal tissues: Material and structural configuration, experimental data and constitutive analysis, Medical Engineering & Physics 31 (9) (2009) 1056-1062.
E. A. Stavropoulou, Y. F. Dafalias, D. P. Sokolis, Biomechanical and histological characteristics of passive esophagus: Experimental investigation and comparative constitutive modeling, Journal of Biomechanics 42 (16) (2009) 2654-2663.
D. P. Sokolis, Structurally-motivated characterization of the passive pseudo-elastic response of esophagus and its layers, Computers in Biology and Medicine 43 (9) (2013) 1273-1285.
Brasseur. J. G., A fluid mechanical perspective on esophageal bolus transport., Dysphagia 2 (1) (1987) 32-39.
M. Li, J. G. Brasseur, Non-steady peristaltic transport in finite-length tubes, Journal of Fluid Mechanics 248 (1993) 129-151.

M. Li, J. G. Brasseur, W. J. Dodds, Analyses of normal and abnormal esophageal transport using computer simulations, American Journal of Physiology-Gastrointestinal and Liver Physiology 266 (4) (1994) G525-G543.
S. K. Ghosh, P. J. Kahrilas, T. Zaki, J. E. Pandolfino, R. J. Joehl, J. G. Brasseur, The mechanical basis of impaired esophageal emptying postfundoplication, American Journal of Physiology-Gastrointestinal and Liver Physiology 289 (1) (2005) G21-G35, pMID: 15691873.
S. Acharya, W. Kou, S. Halder, D. A. Carlson, P. J. Kahrilas, J. E. Pandolfino, N. A. Patankar, Pumping Patterns and Work Done During Peristalsis in Finite-Length Elastic Tubes, Journal of Biomechanical Engineering 143 (7), 071001 (Mar. 2021).
W. Kou, A. P. S. Bhalla, B. E. Griffith, J. E. Pandolfino, P. J. Kahrilas, N. A. Patankar, A fully resolved active musculo-mechanical model for esophageal transport, Journal of Computational Physics 298 (2015) 446-465.
W. Kou, B. E. Griffith, J. E. Pandolfino, P. J. Kahrilas, N. A. Patankar, A continuum mechanics-based musculo-mechanical model for esophageal transport, Journal of Computational Physics 348 (2017) 433-459.
S. Acharya, S. Halder, D. A. Carlson, W. Kou, P. J. Kahrilas, J. E. Pandolfino, N. A. Patankar, Estimation of mechanical work done to open the esophagogastric junction using functional lumen imaging probe panometry, American Journal of Physiology-Gastrointestinal and Liver Physiology 320 (5) (2021) G780-G790, pMID: 33655760.
S. Halder, S. Acharya, W. Kou, P. J. Kahrilas, J. E. Pandolfino, N. A. Patankar, Mechanics informed fluoroscopy of esophageal transport, Biomechanics and Modeling in Mechanobiology 20 (3) (2021) 925-940.
M. Raissi, P. Perdikaris, G. Karniadakis, Physics-informed neural networks: A deep learning framework for solving forward and inverse problems involving nonlinear partial differential equations, Journal of Computational Physics 378 (2019) 686-707.
A. Oezcelik, S. R. DeMeester, General anatomy of the esophagus, Thoracic Surgery Clinics 21 (2) (2011) 289-297, thoracic Anatomy, Part II: Pleura, Mediastinum, Diaphragm, Esophagus.
J. B. Hollis, D. O. Castell, Effect of dry swallows and wet swallows of different vols. on esophageal peristalsis, Journal of Applied Physiology 38 (6) (1975) 1161-1164, pMID: 1141133.
P. A. Yushkevich, J. Piven, H. Cody Hazlett, R. Gimpel Smith, S. Ho, J. C. Gee, G. Gerig, User-guided 3D active contour segmentation of anatomical structures: Significantly improved efficiency and reliability, Neuroimage 31 (3) (2006) 1116-1128.
ÖÇçek, A. Abdulkadir, S. S. Lienkamp, T. Brox, O. Ronneberger, 3D U-Net: Learning Dense Volumetric Segmentation from Sparse Annotation, arXiv e-prints (2016).
A. C. Barnard, W. A. Hunt, W. P. Timlake, E. Varley, A theory of fluid flow in compliant tubes, Biophysical journal 6 (6) (1966) 717-724.
R. D. Kamm, A. H. Shapiro, Unsteady flow in a collapsible tube subjected to external pressure or body forces, Journal of Fluid Mechanics 95 (1) (1979) 1-78.
C. G. Manopoulos, D. S. Mathioulakis, S. G. Tsangaris, One-dimensional model of valveless pumping in a closed loop and a numerical solution, Physics of Fluids 18 (1) (2006) 017106.
J. Ottesen, Valveless pumping in a fluid-filled closed elastic tube-system: one-dimensional theory with experimental validation, Journal of Mathematical Biology 46 (4) (2006) 309-332.
R. Shamsudin, W. Wan Daud, M. Takrif, O. Hassan, C. Ilicali, Rheological properties of josapine pineapple juice at different stages of maturity, International Journal of Food Science & Technology 44 (2009) 757-762.
K. B. Orvar, H. Gregersen, J. Christensen, Biomechanical characteristics of the human esophagus, Digestive diseases and sciences 38 (2) (1993) 197-205.
M. A. Kwiatek, I. Hirano, P. J. Kahrilas, J. Rothe, D. Luger, J. E. Pandolfino, Mechanical properties of the esophagus in eosinophilic esophagitis, Gastroenterology 140 (1) (2011) 82-90.
F. Xia, J. Mao, J. Ding, H. Yang, Observation of normal appearance and wall thickness of esophagus on ct images, European Journal of Radiology 72 (3) (2009) 406-411.
M. Abadi, A. Agarwal, P. Barham, E. Brevdo, Z. Chen, C. Citro, G. S. Corrado, A. Davis, J. Dean, M. Devin, S. Ghemawat, I. Goodfel-

(56)  References Cited

OTHER PUBLICATIONS low, A. Harp, G. Irving, M. Isard, Y. Jia, R. Jozefowicz, L. Kaiser, M. Kudlur, J. Levenberg, D. Mane, R. Monga, S. Moore, D. Murray, C. Olah, M. Schuster, J. Shlens, B. Steiner, I. Sutskever, K. Talwar, P. Tucker, V. Vanhoucke, V. Vasudevan, F. Viegas, O. Vinyals, P. Warden, M.Wattenberg, M.Wicke, Y. Yu, X. Zheng, Tensorflow: Large-scale machine learning on heterogeneous distributed systems (2016).

D. P. Kingma, J. Ba, Adam: A method for stochastic optimization (2017).

R. S. Patel, S. S. C. Rao, Biomechanical and sensory parameters of the human esophagus at four levels, American Journal of Physiology—Gastrointestinal and Liver Physiology 275 (2) (1998) G187-G191, pMID: 9688644.

J. Towns, T. Cockerill, M. Dahan, I. Foster, K. Gaither, A. Grimshaw, V. Hazlewood, S. Lathrop, D. Lifka, G. D. Peterson, R. Roskies, J. R. Scott, N. Wilkins-Diehr, XSEDE: Accelerating scientific discovery, Computing in Science & Engineering 16 (5) (2014) 62-74.

* cited by examiner

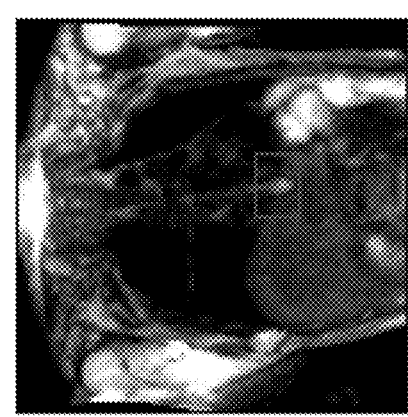
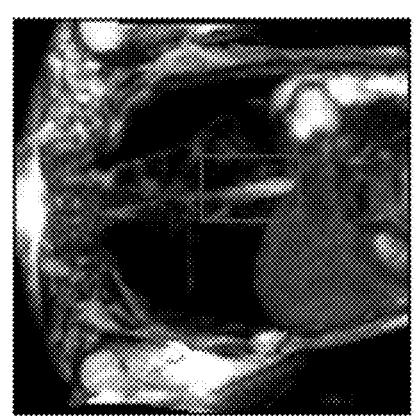
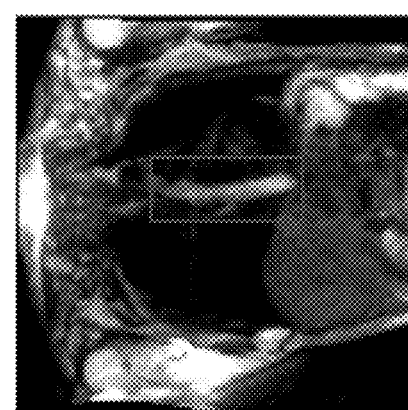
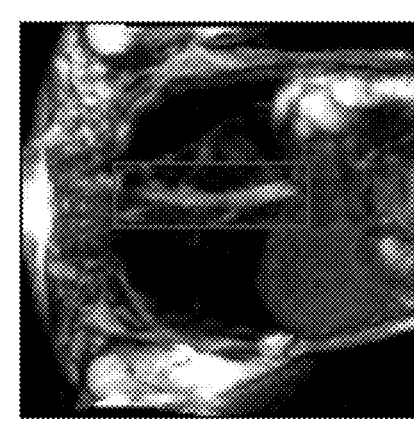
A
B
FIGS. 5A–5B

MECHANICS-INFORMED QUANTITATIVE FLOW ANALYSIS OF MEDICAL IMAGES OF A TUBULAR ORGAN

CROSS-REFERENCE TO RELATED APPLICATIONS

This application claims the benefit of U.S. Provisional Patent Application Ser. No. 63/371,010, filed on Aug. 10, 2022, and entitled "MECHANICS-INFORMED QUANTITATIVE FLOW ANALYSIS OF MEDICAL IMAGES OF A TUBULAR ORGAN," which is herein incorporated by reference in its entirety.

STATEMENT OF FEDERALLY SPONSORED RESEARCH

This invention was made with government support under DK079902 and DK117824 awarded by the National Institutes of Health, and under OAC-1931372 awarded by the National Science Foundation. The government has certain rights in the invention.

BACKGROUND

Esophageal disorders can deteriorate the quality of life and in serious cases, can be life-threatening. It is therefore important to improve current diagnosis technologies for esophageal disorders. Currently, most functional diagnostic techniques like manometry are invasive, while some of the non-invasive techniques such as fluoroscopy are limited in their applicability due to their 2D visualizations. Dynamic magnetic resonance imaging ("MRI") is a popular medical imaging technique that generates 3D image sequences of the flow of a contrast agent inside various tissues and organs and can be a better alternative to fluoroscopy. But its application to imaging bolus transport through the esophagus is relatively unexplored.

Dynamic MRI is a popular non-invasive technique for visualizing flows in tissues such as blood flow in the arteries. But it has not been applied extensively to analyze esophageal transport. This is because the dynamic MRI provides only a qualitative estimate of the nature of bolus transport by visualizing the shape of the bolus inside the esophagus. In comparison, the current invasive tests such as manometry provide quantitative estimates of esophageal function. MRI-MECH bridges this gap by providing a quantitative estimate of the state and functioning of the esophagus from MRI. These would widen the applicability of MRI machines to diagnose esophageal diseases.

SUMMARY OF THE DISCLOSURE

The present disclosure addresses the aforementioned drawbacks by providing a method for analyzing flow through a tubular organ of a subject. The method includes accessing, with a computer system, medical imaging data acquired from the subject, the medical image data depicting transport of a bolus through a tubular organ of the subject. Segmented medical imaging data are generated with the computer system by segmenting the medical imaging data in order to segment the bolus as it is transported through the tubular organ of the subject, and spatiotemporal parameters associated with the bolus are computed from the segmented medical imaging data. A machine learning model that has been trained to estimate quantitative flow analysis parameter data from spatiotemporal parameters associated with a bolus transport is accessed, and quantitative flow analysis parameter data are generated by inputting the spatiotemporal parameter data to the machine learning model using the computer system, generating output data as the quantitative flow analysis data. The quantitative flow analysis parameter data are then presented to a user.

The foregoing and other aspects and advantages of the present disclosure will appear from the following description. In the description, reference is made to the accompanying drawings that form a part hereof, and in which there is shown by way of illustration one or more embodiments. These embodiments do not necessarily represent the full scope of the invention, however, and reference is therefore made to the claims and herein for interpreting the scope of the invention.

BRIEF DESCRIPTION OF THE DRAWINGS

FIG. 2A shows a schematic for the variation of cross-sectional area and pressure at the time instant when the LES cross-section was known. The dashed lines in the pressure variation show what intrabolus pressure would be at other time instants assuming constant LES cross-sectional area. FIG. 2B shows a workflow for the prediction of LES cross-sectional area at other time instants.

FIGS. 5A-5B illustrates an example segmentation of MR images. In FIG. 5A, a bolus is shown in the coronal plane at four time instants (progressing from left to right). The bolus is seen as the bright region inside the red boxes. The bolus volume decreased with time as it was emptied into the stomach. FIG. 5B shows the corresponding 3D segmented bolus shapes for the four time instants. Bolus size has been magnified for visualization.

FIG. 7A shows a variation of A as a function of x and t. The dashed white line indicates the proximal end of the LES. The cross-sectional area above the dashed line was known from the MRI and its prediction by the PINN was ensured by minimizing Equation 13. There is no variation of A along x within the LES due to the constraint described by Equation 12. FIG. 7B shows a variation of the LES cross-sectional area as a function of time. It had the greatest magnitude near the instant that the LES was visible in the MRI.

FIG. 8A shows a variation of U as predicted by the PINN. There are two high velocity zones: one at ×6 cm, t=2 s and the other at the LES for t>2 s. These high velocity zones match the regions of low cross-sectional areas. FIG. 8B shows a variation of the mean flow rate calculated as Q=AU. The high flow rate matches the high velocity zones, but there is a smoother transition of Q at the proximal end of the LES compared to U.

DETAILED DESCRIPTION

Figure 1:
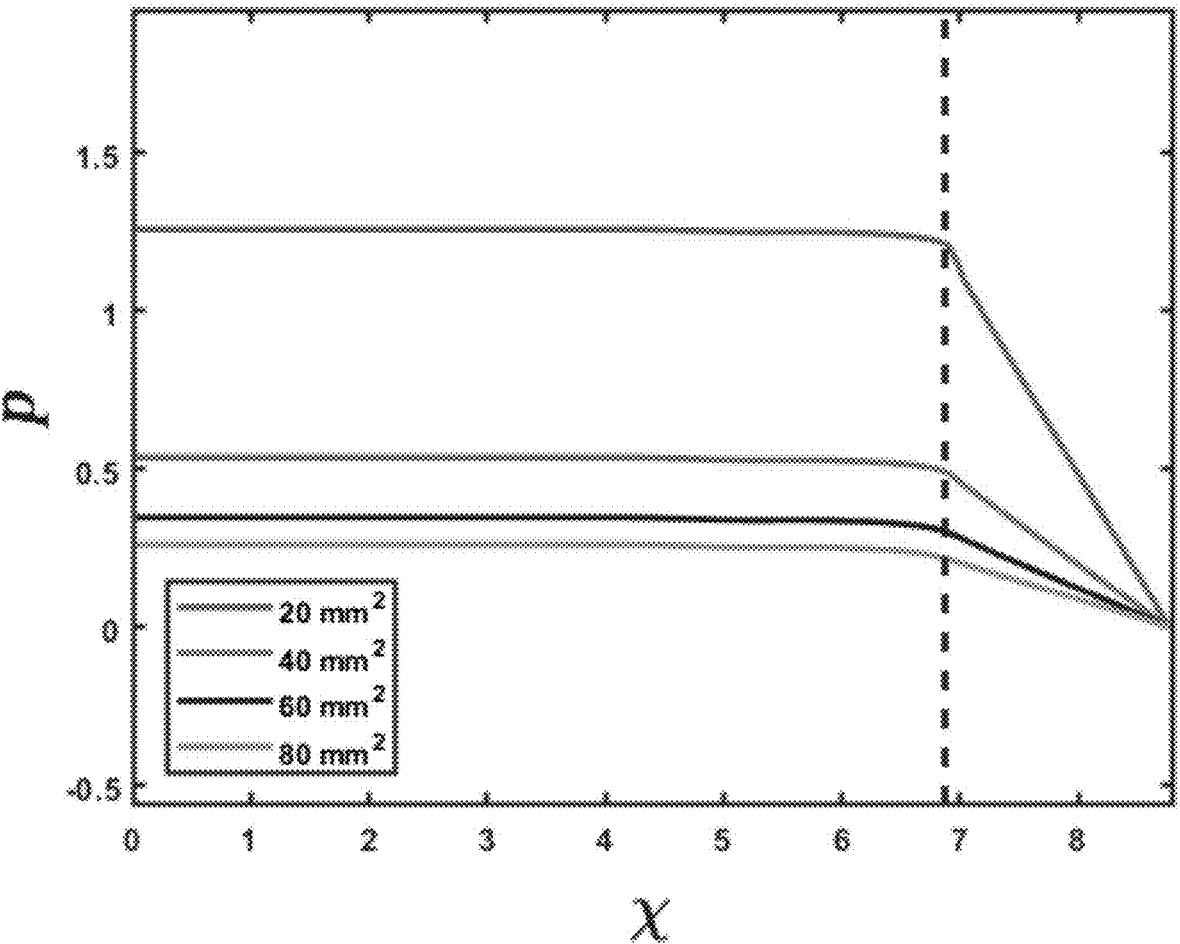
FIG. 1 illustrates the effect of LES cross-sectional area on the prediction of intrabolus pressure. The proximal end of the LES is marked by the vertical dashed line. The inserted legend shows the LES cross-sectional areas used for this simulation. Equations 7 and 8 (described below) were solved to calculate the intrabolus pressure. The input for the model was the variation of a observed from the MRI with four reference LES cross-sectional areas. The variation of pressure is shown at a single time instant to illustrate the impact of LES cross-sectional area on pressure prediction.

Described here are systems and methods for quantifying esophageal bolus transport and esophageal mechanics from medical imaging data, such as dynamic magnetic resonance imaging ("MRI") data, computed tomography ("CT") data, or the like. In general, a machine learning model is used to process geometric or other spatiotemporal parameters of a bolus imaged with medical imaging in order to estimate quantitative parameters of the bolus and/or esophagus, such as cross-sectional area, fluid velocity, and fluid pressure. From these values, other parameters can be computed, such as esophageal stiffness and active relaxation.

The systems and methods described in the present disclosure can be used with dynamic MRI or CT to quantitatively estimate the state and functioning of the esophagus and help in better diagnosis of esophageal disorders. Advantageously, the proposed framework can enhance the resolution of dynamic MRI at specific locations to increase its applicability to clinical practice. The systems and methods can also be adapted to analyze tubular organs in the human body other than the esophagus.

Advantageously, the systems and methods described in the present disclosure provide a more robust analytical framework than current pure physics-based tools for analysis of esophageal transport that works with fluoroscopy, since the disclosed systems and methods can predict with missing information in the medical images.

In general, the systems and methods described in the present disclosure provide a hybrid computational framework (e.g., based on deep learning and fluid mechanics) that enhances the capability and increases the applicability of dynamic MRI, or other imaging modalities, for diagnosing esophageal disorders. As a non-limiting example, when applied to dynamic MRI, the framework may be referred to as a mechanics-informed MRI ("MRI-MECH") framework. The disclosed systems and methods can predict esophageal wall properties and motility, such as active relaxation, which that locally reduces bolus pressure. Unlike other analysis techniques that work with fluoroscopy, the disclosed systems and methods also predict missing information in dynamic MRI or CT image series, thereby improving the resolution as well as the functionality of the medical imaging modality.

In a non-limiting example applied to dynamic MRI, the disclosed MRI-MECH framework is a computational framework that enhances the capability and increases the applicability of dynamic MRI for diagnosing esophageal disorders. Simple fluids, such as pineapple juice, can be used as the swallowed contrast agent for the dynamic MRI and the generated image sequence can be used as input to the MRI-MECH framework described below in more detail. The MRI-MECH framework models the esophagus as a flexible one-dimensional tube, and the flow through it is governed by one-dimensional mass and momentum conservation equations and the elastic tube walls follow a linear tube-law. These equations are solved using a physics-informed neural network ("PINN"). The PINN minimizes the difference between the measurements from the MRI and the predictions as well as ensures that the physics of the fluid flow problem is always followed. MRI-MECH calculates the fluid velocity and pressure during the esophageal transport, followed by the estimation of the mechanical health of the esophagus by calculating the esophageal wall stiffness and active relaxation. Additionally, MRI-MECH can also predict missing information about the lower esophageal sphincter ("LES") during the esophageal emptying process, thus, demonstrating its capability of being to scenarios with missing data or poor image resolution.

Generally, the LES cross-sectional area is very difficult to visualize in MRI because it is significantly smaller than the cross-sectional area at the esophageal body. In this regard, MRI-MECH enhances the capability of the dynamic MRI by calculating the LES cross-sectional area during the esophageal emptying. The mechanics-based analysis with detailed three-dimensional visualization of the bolus in MRI leads to significantly better prediction of the state of the esophagus compared to two-dimensional x-ray imaging such as esophagram and fluoroscopy, and can be readily extended to other medical imaging techniques such as CT.

In the MRI-MECH framework described in the present disclosure, transport through the esophagus is modeled as one-dimensional fluid flow through a flexible tube. The mass and momentum conservation equations in one dimension are as follows:

$$\frac{\partial A}{\partial t} + \frac{\partial (AU)}{\partial x} = 0 \tag{1}$$

-continued $$\frac{\partial U}{\partial t} + \frac{\partial}{\partial x}\left(\frac{U^2}{2}\right) + \frac{1}{\rho}\frac{\partial P}{\partial x} + \frac{8\pi\mu U}{\rho A} = 0 \tag{2}$$

where A is the cross-sectional area of the esophageal lumen, U and P are the velocity and pressure in the bolus fluid, respectively; x represents the distance along the length of the esophagus from the mouth to the stomach; and t represents time. The total time for bolus transport in an example analysis was 6.95 seconds. The quantities ρ and μ are the density and dynamic viscosity of the transported fluid, respectively.

The fluid pressure developed inside the esophagus is linearly proportional to the cross-sectional area of the esophageal lumen in the absence of any neuromuscular activation. Using this information, a pressure tube-law can be constructed as follows:

$$P = P_o + K\left(\frac{A}{\theta A_o} - 1\right) \tag{3}$$

where K is the stiffness of the esophageal wall, $P_o$ is the pressure outside the esophageal wall and is often equal to the thoracic pressure, $A_o$ is the cross-sectional area of the esophageal lumen in its inactive state, and θ is an activation parameter. Typically, the inactive cross-sectional area is in the range 7-59 mm². In an example case, the inactive cross-sectional area, $A_o$, was 27 mm². The activation parameter, θ, takes the value of 1 in the inactive state of the esophagus. It can be seen from Equation 3 that in the inactive state, when the cross-sectional area of the esophageal lumen is equal to $A_o$, the pressure inside the esophagus is equal to $P_o$. Due to the lack of information about the thoracic pressure, it can be assumed that $P_o$=0 mmHg. An activation is induced when θ<1, raising the pressure locally. On the other hand, θ>1 decreases the bolus pressure and estimates the active relaxation of the esophageal wall. Thus, the parameter θ captures the effect of the esophageal motility.

When the dynamic MRI data have low spatial and/or temporal resolution, the dynamic MRI data can be interpolated to smaller spatial and/or temporal scales. The measured volume $V_m$ of the bolus from the proximal end (x=0) to any point x>0 can be calculated as follows:

$$V_m = \int_0^x A_m dx \tag{4}$$

where $A_m$ is the measured cross-sectional area of the esophageal lumen at a coarse x and t. As a non-limiting example, the volume $V_m$ can be interpolated using piecewise cubic Hermite interpolating polynomial to a smaller temporal and spatial scale to obtain V. In an example study, $V_o$ was known at 7 time instants and 59 points along x. The interpolated V was calculated in this example at 100 time instants and 100 points along x. Using Equations 1 and 4, the cross-sectional areas and velocities at finer t and x can be calculated as follows:

$$A = \frac{\partial V}{\partial x} \tag{5}$$

-continued $$U = -\frac{1}{A}\frac{\partial V}{\partial t} \tag{6}$$

The values of A and U can then be used to solve for P in Equation 2. Equations 1 and 2 can be non-dimensionalized as follows:

$$\frac{\partial \alpha}{\partial \tau} + \frac{\partial(\alpha u)}{\partial \chi} = 0 \tag{7}$$

$$\frac{\partial u}{\partial \tau} + \frac{\partial}{\partial \chi}\left(\frac{u^2}{2}\right) + \frac{\partial p}{\partial \chi} + \phi\frac{u}{\alpha} = 0 \tag{8}$$

where $\alpha$=A/$A_s$, u=U/c, $\chi$=x/$\sqrt{A_s}$, $\tau$=ct/$\sqrt{A_s}$, p=P/($\rho c^2$), $\phi$=($8\pi\mu$)/$\rho c\sqrt{A_s}$, $A_s$=max(A), and c=5 cm/s, which is a reference speed of peristalsis. In an example study, $A_s$=197.73 mm³. Using the properties of the swallowed fluid and the scales for A and U in an example study, the value for $\phi$ was found as $\phi$=0.101. The pressure tube-law as described in Equation 3 can be non-dimensionalized as follows:

$$p = k\left(\frac{\alpha}{\theta\alpha_o} - 1\right) \tag{9}$$

where k=K/($\rho c^2$) and $\alpha_o$=$A_o$/$A_s$. This non-dimensionalization ensures that the magnitudes of $\alpha$, u, and p lie between −1 and 1, which is advantageous for good prediction by the PINN as described later.

The boundary conditions of this problem can be specified to capture the physiological conditions of normal esophageal transport. The upper esophageal sphincter ("UES") at the proximal end of the esophagus opens to allow the bolus into the esophagus, closes once the fluid has passed through it, and remains closed thereafter. Hence, zero velocity at x=0 can be specified for all time instants. This condition also ensures that $V_m$=0 at x=0 at all time instants and is consistent with Equations 4 and 6. The distal end of the esophagus, on the other hand, remains open to allow emptying into the stomach. Since the pressure term in Equation 2 contains a single derivative with respect to x, only one boundary condition for P needs to be specified. The boundary pressure can be specified at the distal end, which can be equal to a typical value of gastric pressure (e.g., 7 mmHg). For initial conditions, zero velocity can be set at all points along x at t=0.

Low spatial resolution the dynamic MRI can pose a problem of accurately identifying the lower esophageal sphincter ("LES") cross-section. This is because the LES opening is narrower compared to the esophageal body and does not distend very much because of the greater wall stiffness at the esophagogastric junction ("EGJ:). Although this could be improved by focusing the MRI only at the LES, the state of the esophagus proximal to the LES cannot be estimated in such a scenario. The LES can be identified in only one or two time instants when the LES has greatly distended due to a bolus flow through it. The LES cross-sectional area measured at this time instant can act as a valuable reference to identify the bolus behavior proximal to the LES.

As described above, since pressure can be specified as a Dirichlet boundary condition at the distal end of the esophagus, the intrabolus pressure prediction can depend on the accurate measurement of the LES cross-sectional area. FIG. 1 shows the intrabolus pressure calculated using a numerical approach with different LES cross-sectional areas. The pressure shown is non-dimensional and the pressure at the distal end was specified zero as a reference in this case. The total length of the esophagus considered here is the sum of the centerline length (9.65 cm) and the LES length (2.78 cm). Thus, the proximal and distal location of the bolus were 9.65 cm and 12.43 cm, respectively. In non-dimensional form, the proximal and distal locations were $\chi_p$=6.87 and $\chi_L$=8.81, respectively. The quantities $\chi_p$ and $\chi_L$ can be advantageous locations as described below. As shown in FIG. 1, the intrabolus pressure proximal to the LES depends on the LES cross-sectional area, so, assuming a constant LES cross-sectional area (measured at one time instant) would lead to an incorrect prediction, making it important to know the instantaneous LES cross-sectional area to accurately predict intrabolus as well as to understand LES functioning during emptying.

Figures 2A, 2B:
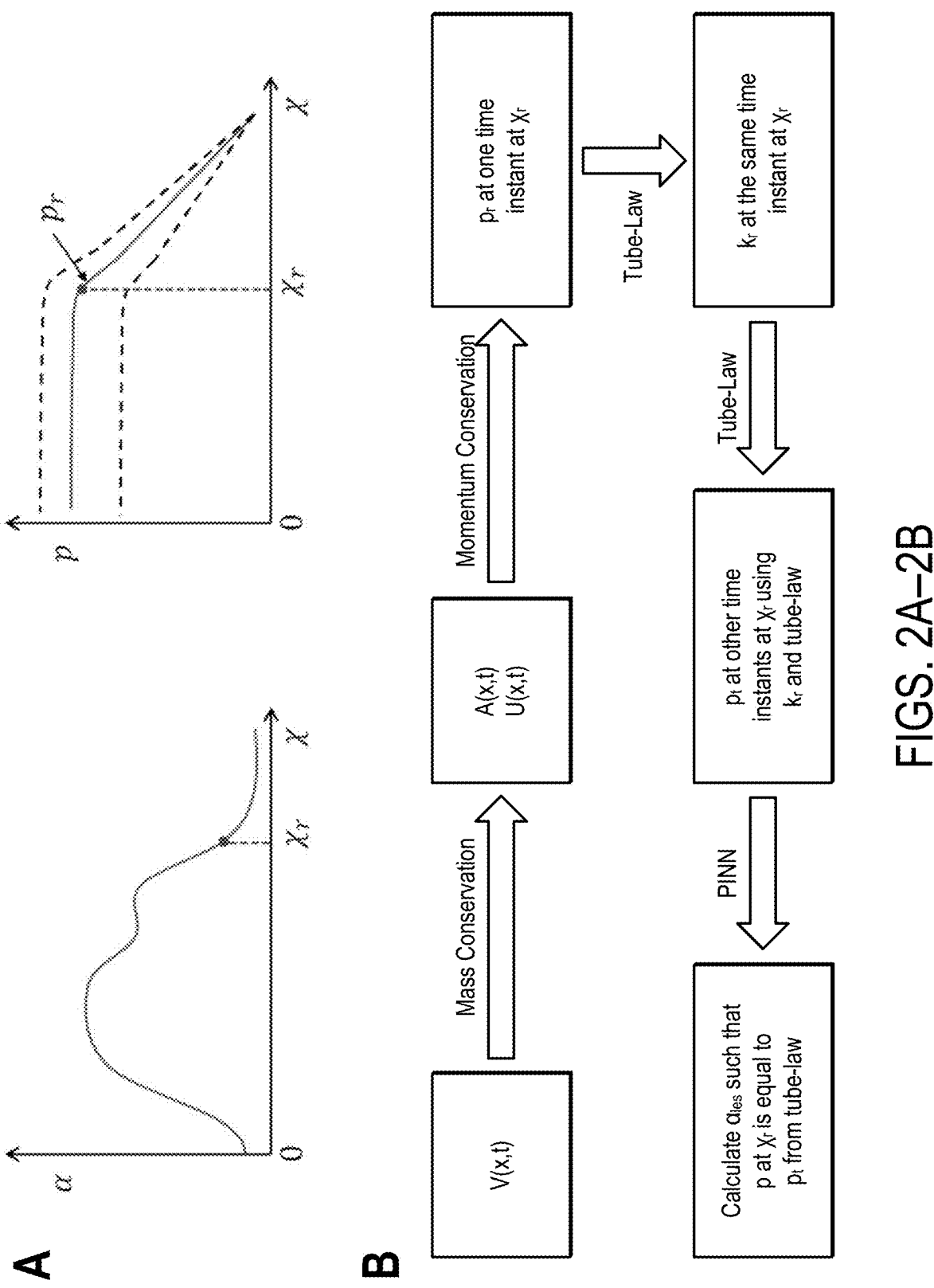
FIGS. 2A-2B illustrate the problem definition for the physics informed neural network (PINN) framework.

The problem of missing data for the LES cross-sectional area (and consequently obtaining accurate intrabolus pressure values) can be solved using a physics-informed neural network ("PINN"). The problem description is schematically shown in FIG. 2. The final interpolated volume V(x, t) was used to calculate A(x, t) and U(x, t) using Equations 5 and 6, and after non-dimensionalization, $\alpha(\chi, \tau)$ and $u(\chi, \tau)$, respectively. These values of $\alpha(\chi, \tau)$ and $u(\chi, \tau)$ can then used to calculate $p(\chi_r, \tau_r)$ at the specific time instant when the LES cross-section was visible by solving Equation 8 using a finite volume method. The non-dimensional time, $\tau_r$, corresponds to the time instant when the LES was visible in MRI. The point $\chi_r$ can be selected near the proximal end of the LES. This point can be selected because the pressure at points proximal to $\chi_r$ are of similar magnitude as $p(\chi_r, \tau)$ as shown in FIG. 1. Additionally, when $\chi_r$ is selected to be very close to the LES the effect of active relaxation as observed in the esophageal body can be minimal. In the example study referenced above, the values of $\chi_r$ and $\tau_r$ were 6.76 and 8.57, respectively. The pressure $p(\chi_r, \tau_r)$ can be viewed as the correct estimate of the intrabolus pressure when the LES cross-sectional area is accurately known. This pressure can be referred to as the reference pressure, $p_r = p(\chi_r, \tau_r)$. Using the tube-law in Equation 9, the stiffness, $k_r$, at $\chi_r$ can be calculated as follows:

$$k_r = \frac{p_r}{\left(\frac{\alpha(\chi_r, \tau_r)}{\alpha_o} - 1\right)} \qquad (10)$$

Note that there is no $\theta$ in Equation (10) since it can be assumed that $\theta$=1 at $\chi_r$. With the stiffness at $\chi_r$, the pressure $p_t = p(\chi_r, \tau)$ can be calculated at other times with the tube-law according to Equation 9 as follows:

$$p_t = k_r \left(\frac{\alpha(\chi_r, \tau_r)}{\alpha_o} - 1\right) \qquad (11)$$

The LES cross-sectional area ($A_{les}$) can be calculated using a PINN such that the pressure predicted at $\chi_r$ matches $p_t$ for all times. An additional constraint can be used to ensure an unique solution for $A_{les}$ as follows:

$$\frac{\partial \alpha_{les}}{\partial \chi} = 0 \qquad (12)$$

where $\alpha_{les} = A_{les}/A_s$ is the non-dimensional cross-sectional area of the LES. Equation 12 implies that there is no significant variation of LES cross-sectional area along $\chi$. This is physically meaningful since the variation of $\alpha_{les}$ along $\chi$ can be negligible compared to the esophageal body.

Figure 3:
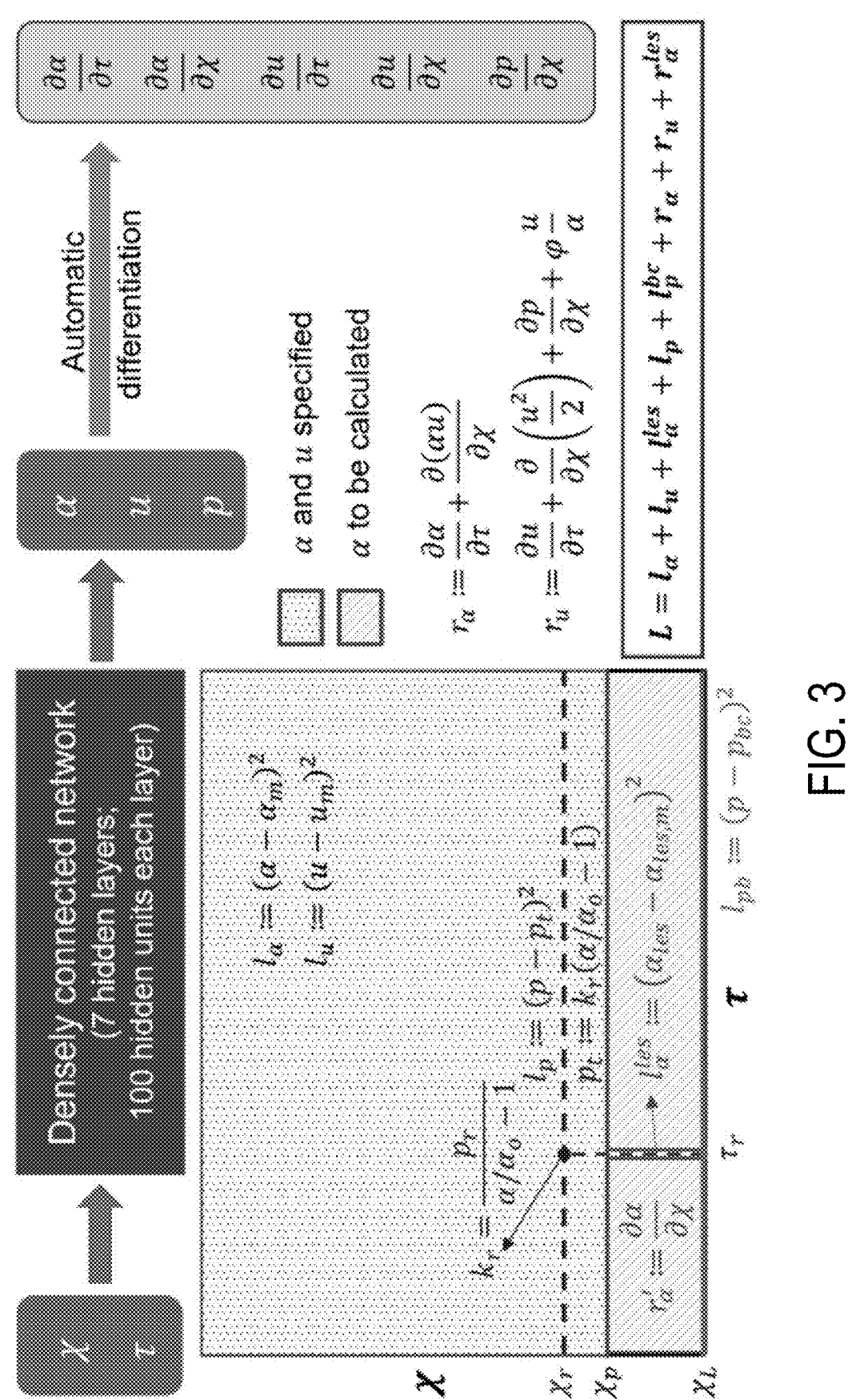
FIG. 3 shows details of the physics-informed neural network (PINN). The input and output of the PINN along with the details of the hidden layers are shown at the top. Automatic differentiation was used to calculate the derivative terms for the residuals. The schematic of the domain is shown below. The schematic describes where the different losses were specified.

FIG. 3 shows an example neural network architecture for the PINN. This example neural network takes $\chi$ and $\tau$ as inputs and predicts $\alpha$, u, and p as outputs. Since the inputs are $\chi$ and $\tau$, automatic differentiation can be used effectively to calculate $$\frac{\partial \alpha}{\partial \tau}, \frac{\partial \alpha}{\partial \chi}, \frac{\partial u}{\partial \tau}, \frac{\partial u}{\partial \chi}, \text{ and } \frac{\partial p}{\partial \chi},$$

which are used for calculating the terms in Eqns. (7) and (8). Aside from the input and the output layers, the example PINN architecture includes seven hidden layers with 100 hidden units in each layer. As a non-limiting example, the tanh activation function can be used for every layer.

The losses for the PINN include a combination of measurement losses and residuals of the mass and momentum conservation equations. Minimizing the measurement losses ensures that the solutions are consistent with the measurements, and minimizing the residuals ensures that the governing physics behind the problem is followed. FIG. 3 shows the locations and time instant at which the different measurement losses and residuals are calculated. As already mentioned in the work-flow, $\alpha$ and u were known at all points proximal to the bolus (marked in red in FIG. 3) for all time instants. The measurement losses for $\alpha$ and u for $\chi < \chi_p$ and $0 \geq \tau \geq \tau_T$ can be as follows:

$$l_\alpha = \frac{1}{N_1} \sum_{i=1}^{N_1} \left(\alpha^i - \alpha_m^i\right)^2 \qquad (13)$$

$$l_u = \frac{1}{N_1} \sum_{i=1}^{N_1} \left(u^i - u_m^i\right)^2 \qquad (14)$$

where the quantities with subscript "m" represent measured quantities. The parameter $\chi_p$ is the proximal end of the LES and $\tau_T$ is the total time (non-dimensional) of bolus transport. In an example implementation, each point, i, was taken from a Cartesian grid of 99 nodes along $\tau$ and 100 nodes along $\chi$, which leads to $N_1$=9900. Note that $u_m$ is considered a measured quantity for the PINN although it is calculated along with $\alpha$ through the interpolated volume V as described above. This is because the PINN minimizes the square of the difference between prediction of $\alpha$ and u from the network with their already known values, which are analogous to measurements for being already known quantities for the PINN.

Additionally, the LES cross-sectional area can be known at $\tau = \tau_r$ for $\chi_p < \chi \leq \chi_L$ and the corresponding measurement loss can be as follows:

$$l_\alpha^{les} = \frac{1}{N_2} \sum_{i=1}^{N_2} \left(\alpha_{les}^i - \alpha_{les,m}^i\right)^2 \qquad (15)$$

where $\chi_L$ is the non-dimensional coordinate of the distal end. As a non-limiting example, the points, i, can be taken from a uniform mesh of $N_2=28$ points along $\chi$ at $\tau_r$. The measurement loss for pressure can be calculated at $\chi=\chi_r$ for $\tau\geq0$ and can be defined as follows:

$$l_p = \frac{1}{N_3}\sum_{i=1}^{N_3}\left(p^i - p_t^i\right)^2 \qquad (16)$$

where as a non-limiting example the points, i, can be selected from a uniform mesh of $N_3=98$ along $\rho$ at $\chi=\chi_r$. Additionally, the Dirichlet pressure boundary condition can be enforced at $\chi=\chi_L$ for $\tau\geq0$ through the following loss:

$$l_p^{bc} = \frac{1}{N_4}\sum_{i=1}^{N_4}\left(p^i = p_{bc}^i\right)^2 \qquad (17)$$

where $p_{bc}$ is the pressure specified at the distal end of the esophagus and $N_4=99$ as an example with i selected from a uniform grid along $\tau$. The residual losses can be calculated in the entire domain for $0\leq\chi\leq\chi_L$ and $\tau\geq0$ according to Equations 7 and 8 as shown below:

$$r_\alpha = \frac{1}{N_5}\sum_{i=1}^{N_5}\left(\frac{\partial\alpha^i}{\partial\tau} + \frac{\partial\left(\alpha^i u^i\right)}{\partial\chi}\right) \qquad (18)$$

$$r_u = \frac{1}{N_5}\sum_{i=1}^{N_5}\left(\frac{\partial u^i}{\partial\tau} + \frac{\partial}{\partial\chi}\left(\frac{\left(u^i\right)^2}{2}\right) + \frac{\partial p^i}{\partial\chi} + \phi\frac{u^i}{\alpha^i}\right) \qquad (19)$$

where i can be randomly sampled from a uniform distribution of points in the entire domain with $N_5=50,688$ as an example. The constraint as described in Equation 12 leads to the following residual:

$$r_\alpha^{les} = \frac{1}{N_6}\sum_{i=1}^{N_6}\frac{\partial\alpha_{les}^i}{\partial\chi} = 0 \qquad (20)$$

where i can be randomly sampled from a uniform distribution of points in the domains $[\chi_p,\chi_L]$ and $[0,\tau_T]$ with $N_6=5,544$ as an example. The total loss for the PINN cam be the sum of all the measurement losses and residuals as follows:

$$L=l_\alpha+l_u+l_\alpha^{les}+l_p+l_p^{bc}+r_\alpha+r_u+r_\alpha^{les} \qquad (21)$$

To train the network, the $\chi$ and $\tau$ can be normalized with their mean and standard deviation as follows:

$$\chi' = \frac{\chi - \mu_\chi}{\sigma_\chi} \qquad (22)$$

$$\tau' = \frac{\tau - \mu_\tau}{\sigma_\tau} \qquad (23)$$

where $\mu$ and $\sigma$ are the corresponding mean and standard deviations, respectively for $\chi$ and $\tau$. Hence, the derivatives with respect to $\chi$ and $\tau$ can be modified as follows:

$$\frac{\partial}{\partial\chi}(\cdot) = \frac{1}{\sigma_\chi}\frac{\partial}{\partial\chi'}(\cdot) \qquad (24)$$

$$\frac{\partial}{\partial\tau}(\cdot) = \frac{1}{\sigma_\tau}\frac{\partial}{\partial\tau'}(\cdot) \qquad (25)$$

As a non-limiting example, the PINN network can be trained using Tensorflow for 100,000 epochs. An Adam optimizer can be used to minimize the losses. A piecewise constant decayed learning rate can be used to minimize the losses efficiently. In an example implementation, the learning rate was 0.001 for the first 10,000 epochs, 0.0001 for the next 20,000 epochs, and 0.00003 for the last 70,000 epochs. The final values for $l_\alpha$, $l_u$, $l_\alpha^{les}$, $l_p$, $l_p^{bc}$, $r_\alpha$, $r_u$, $r_\alpha^{les}$ were $5.9\times10^5$, $9.8\times10^{-7}$, $5.3\times10^{-5}$, $4.0\times10^{-7}$, $2.7\times10^{-7}$, $2.9\times10^{-5}$, $7.2\times10^{-5}$, and $3.8\times10^{-6}$, respectively. The final total loss was $2.2\times10^{-4}$.

Figure 4:
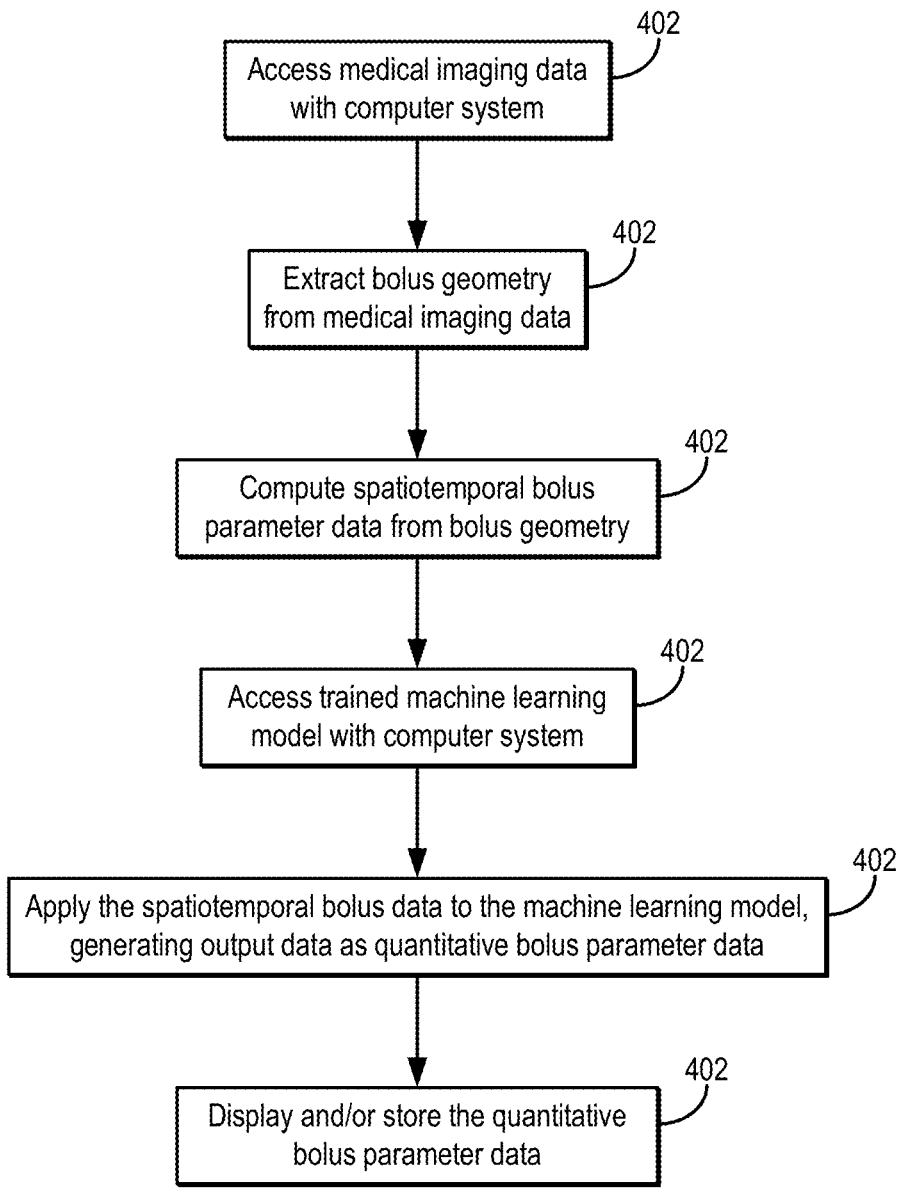
FIG. 4 is a flowchart of an example method for quantifying bolus transport and esophageal function using a mechanics-informed hybrid computation framework processing medical images such as dynamic MRI data or CT data.

Referring now to FIG. 4. A flowchart is illustrated as showing the steps of an example method for performing quantitative analysis of bolus transport and/or esophageal function using a mechanics-informed processing of medical imaging data using a hybrid computational framework.

The method includes accessing medical imaging data with a computer system, as indicated at step 402. Accessing the medical imaging data can include using the computer system to retrieve previously acquired data from a memory or other data storage device or medium. Additionally or alternatively, accessing the medical imaging data can include acquiring the data using a suitable medical imaging system and communicating or otherwise transferring the data to the computer system, which in some embodiments may be a part of the medical imaging system. As one example, the medical imaging data can include MRI data acquired with an MRI system, and may include k-space data and/or images reconstructed from k-space data or other data acquired with the MRI system. As another example, the medical imaging data can include CT data acquired with a CT system, and may include projection data and/or images reconstructed from projection data or other data acquired with the CT system. In general, the medical imaging data are acquired while a subject is administered a bolus of fluid, which in some instances may include a contrast agent or a fluid doped with a contrast agent such that the medical imaging system can preferentially visualize the bolus as it is swallowed by the subject.

As a non-limiting example, the medical imaging data can include dynamic MRI data, which may include a time series of images and/or image volumes acquired from a subject using an MRI system. For instance, the MRI data can include data acquired while performing a 3D MR angiography sequence designed for contrast-enhanced cardiac imaging applications, which can be adapted to be used for esophageal imaging using an oral contrast agent (e.g., pineapple juice, barium, or other suitable fluids that provide enhanced image contrast based on the imaging modality used to acquire the medical imaging data). Advantageously, using the systems and methods described I the present disclosure, the volume of the bolus can be relatively small, such as on the order of tens of mL or less.

In an example implementation, pulse sequence parameters included $(3.25\text{ mm})^3$ spatial/1.17 s temporal resolution, $(416\text{ mm})^2\times143$ mm coronal field of view, 0.78 ms echo time, 2.36 ms repetition time, 29 degree tip angle, 620 Hz/pixel bandwidth, ⅝ partial Fourier acquisition, R=2 GRAPPA acceleration, 8% central size/10% outer density view sharing. A 4-channel cardiac coil was used for image acquisition, placed on the upper torso surface. To improve image conspicuity of the juice bolus, pineapple juice was reduced to a volume factor of 0.48 (i.e., 52% volume removed) through gradual heating without boiling. By doing so, the T1 of the juice at 1.5 T was reduced from 265 ms (raw/non-volume reduced juice) to 76 ms (volume-reduced juice), as measured by variable flip angle signal fit.

A model of the bolus is then extracted or otherwise constructed from the medical imaging data using the computer system, as indicated at step 404. In general, the bolus geometry model includes a model (e.g., a wire mesh model, a point cloud model, another geometry-based model) of the bolus. In some implementations, the bolus geometry model is extracted from the medical imaging data based on a segmentation of the medical imaging data. The medical imaging data may be segmented manually, semi-automatically, or automatically. As a non-limiting example, the bolus geometry model can be constructed based on a manual segmentation of an identified bolus in the medical imaging data. As another non-limiting example, the bolus geometry model can be constructed based on segmented medical imaging data that are generated by applying the medical imaging data to a trained machine learning algorithm, such as a trained neural network, that generates output data as segmented medical imaging data in which a bolus is segmented from the medical imaging data. For instance, a deep learning based automated segmentation approach such as 3D U-Net, described in more detail below, can be implemented and fine-tuned for segmenting a bolus from medical imaging data.

In a non-limiting example, the medical imaging can include MRI data having voxels in a Cartesian coordinate system with different magnitudes of intensity. The temporal resolution of the dynamic MRI (1.17 second) determined the number of images with the bolus seen within the esophagus; 7 time instants in this study. The typical length of an adult esophagus is 18-25 cm. The average velocity of a normal peristalsis is approximately 3.3 cm/s. Thus, an average swallow sequence usually takes 5-8 seconds. Therefore, the aforementioned temporal resolutions can result in approximately 5-8 images. Although this temporal resolution is not comparable to fluoroscopy, the detailed three-dimensional geometry of the bolus in MRI leads to better prediction of velocity and intrabolus pressure, thereby resulting in better prediction of esophageal wall properties.

As noted above, in some implementations to bolus can be manually segmented. Thus, in one example the bolus was manually segmented for the 7 time instants, a few of which are shown in FIG. 5. The segmentation assigned a value of 1 and 0 to each voxel that lay inside and outside the bolus, respectively.

Figure 6:
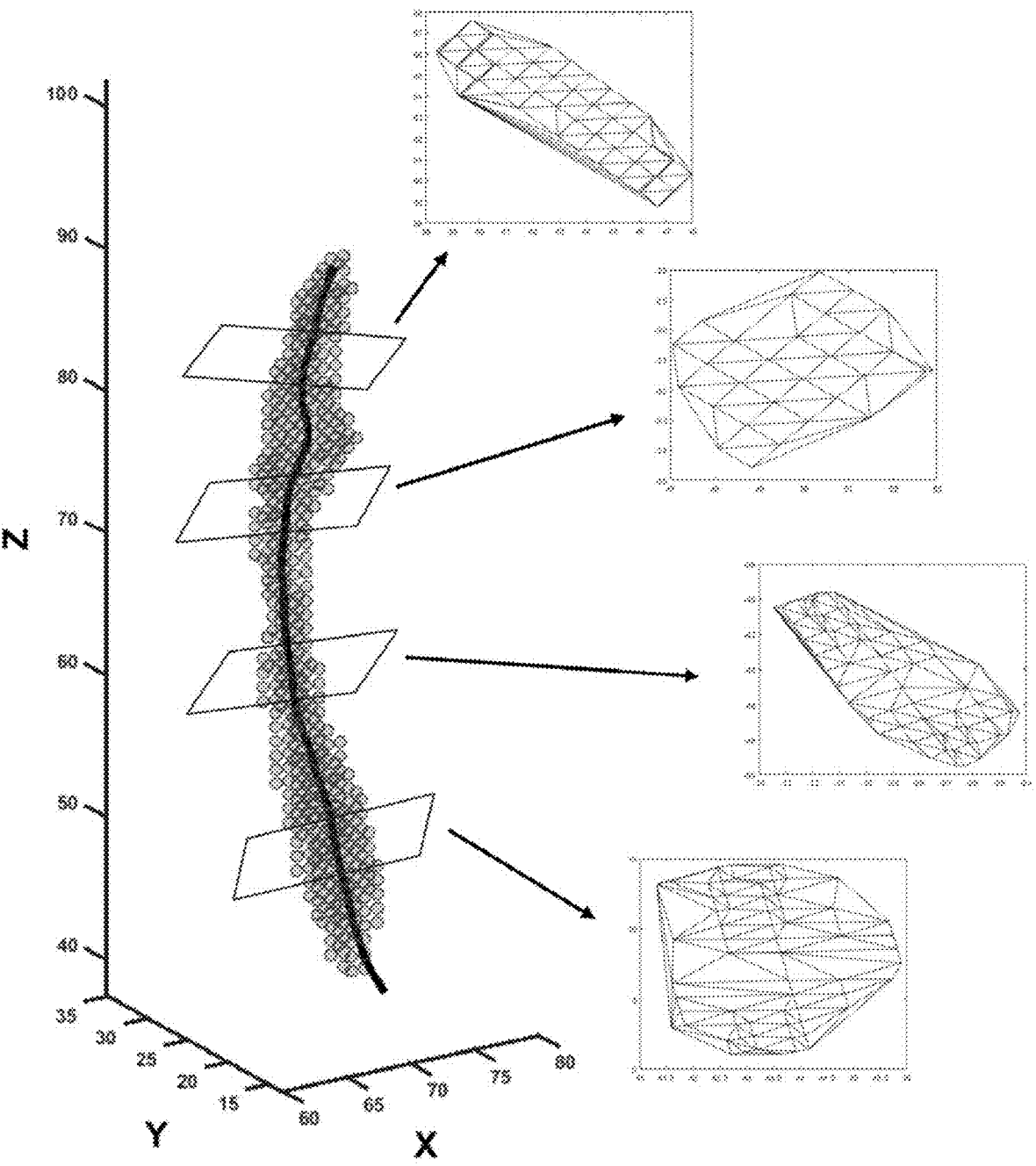
FIG. 6 illustrates an example extraction of cross-sectional areas from dynamic MR images. The segmented bolus geometry at one time instant is shown by the red points in the scatter plot. The generated center line is shown by the black curve inside. A few planes are shown which are perpendicular to the center line and on which the cross-sectional areas were calculated. The points on the planes were meshed using Delaunay triangulation and the triangulated shapes approximate the cross-sectional areas at those planes.

In some implementations, MRI-MECH models the esophagus as a one-dimensional flexible tube. For such one-dimensional analysis, the variation of cross-sectional areas at different points along the length of the esophagus and different time instants can be extracted from the three-dimensional bolus model obtained from segmentation. This can be done in two steps. The first step is to generate a center line along the length of the esophagus. The bolus shapes observed at different time instants can be superimposed and then cross-sections of the superimposed shape at different horizontal planes from the proximal to the distal end of the superimposed shape can be generated. The centroids of these cross-sections can be connected to form the center line. The length of the center line in the example study mentioned above was 9.65 cm. In the second step, after extracting the center line, planes perpendicular to the centerline are generated, as shown in FIG. 6. The segmented voxels associated with the bolus and which lay near these perpendicular planes are projected onto these planes. These projected points can be connected using Delaunay triangulation, as shown in FIG. 6. The cross-sectional area at each point along the center line can then calculated as the sum of the triangles in the Delaunay triangulated geometries.

The segmented volume, center line data, centroid data, cross-sectional planes, and so on can all be stored in the bolus geometry model data.

Referring again to FIG. 4, based on the bolus geometry model data, spatiotemporal parameter data are computed using the computer system, as indicated at step 406. For instance, the spatiotemporal parameters include the distance along the length of the esophagus from the mouth to the stomach, and the time at which images were acquired. In some implementations, the spatiotemporal parameters can be non-dimensionalized. For instance, the spatial parameters, x, can be non-dimensionalized as $\chi = x/\sqrt{A_s}$, and the temporal parameters, t, can be non-dimensionalized as $\tau = ct/\sqrt{A_s}$, where $A_s$ is the maximum cross-sectional area in the bolus geometry model data and c is the reference speed for peristalsis.

Referring again to FIG. 4, a machine learning model is accessed with the computer system, as indicated at step 408. Accessing the trained machine learning model may include accessing model parameters (e.g., weights, biases, or both) that have been optimized or otherwise estimated by training the machine learning model on training data. The machine learning model may be, for example, an artificial neural network. The artificial neural network may be a physics-informed neural network.

In some instances, retrieving the neural networks can also include retrieving, constructing, or otherwise accessing the particular neural network architecture(s) to be implemented. For instance, data pertaining to the layers in the neural network architecture(s) (e.g., number of layers, type of layers, ordering of layers, connections between layers, hyperparameters for layers) may be retrieved, selected, constructed, or otherwise accessed.

In general, the machine learning model is trained, or has been trained, on training data in order to estimate quantitative parameters (e.g., cross-sectional area, fluid velocity, fluid pressure) from spatiotemporal bolus parameters, such as the measured positions and time points at which the bolus is tracked with medical imaging.

The spatiotemporal parameter data are then input to the machine learning model, generating output data as quantitative flow analysis parameter data, as indicated at step 410. As an example, the quantitative flow analysis parameter data can include one or more of cross-sectional area, fluid velocity, and fluid pressure. From these estimated parameter, additional parameters can be computed, including esophageal wall stiffness and active relaxation. For instance, the esophageal wall stiffness and active relaxation can be calculated as follows. A few manipulations of Equation 3 yields the following:

$$\frac{P - P_o}{\left(\frac{A}{A_o} - 1\right)} = \frac{K}{\theta}\left(1 - \frac{\theta - 1}{\left(\frac{A}{A_o} - 1\right)}\right) \tag{26}$$

The active relaxation parameter $\theta$ is always greater than 1 at the location of the bolus. Additionally, $A > A_o$ at the bolus due to the distension of esophageal walls. Thus, the second term of Equation 26 is always greater than 0. Using these constraints the following inequality can be constructed:

$$\frac{K}{\theta} \geq \frac{P - P_o}{\left(\frac{A}{A_o} - 1\right)} \qquad (27)$$

where $K/\theta$ estimates the lower bound of the esophageal stiffness and incorporates the effect of active relaxation as well. The active relaxation of the esophageal walls was estimated as follows:

$$\theta = \frac{\alpha}{\alpha_r} \qquad (28)$$

where $\alpha_r$ is the reference non-dimensional cross-sectional area near the distal end of the esophageal body at $\chi = \chi_r$ as shown in FIG. 2. The value of the $\theta$ at $\chi_r$ can be assumed to be 1 and can act as a reference to calculate active relaxation for all $\chi < \chi_r$.

The quantitative bolus parameter data generated by inputting the spatiotemporal parameter data to the machine learning model, and any additional quantitative parameters computed from those data, can then be displayed to a user, stored for later use or further processing, or both, as indicated at step 412.

Figures 7A, 7B:
FIGS. 7A-7B illustrate variation of cross-sectional area as predicted by the PINN.

The PINN predicts the non-dimensional cross-sectional area, fluid velocity, and fluid pressure by minimizing a set of measurement losses as well as ensuring that the physics of the fluid flow problem is followed throughout. An example of the variation of the predicted cross-sectional area (in its dimensional form) is shown in FIG. 7A for all values of x and t. The values of the cross-sectional areas inside the bolus proximal to the LES were obtained from measurements and their prediction was based on the minimization the measurement loss as described by Equation 13.

Figures 8A, 8B:
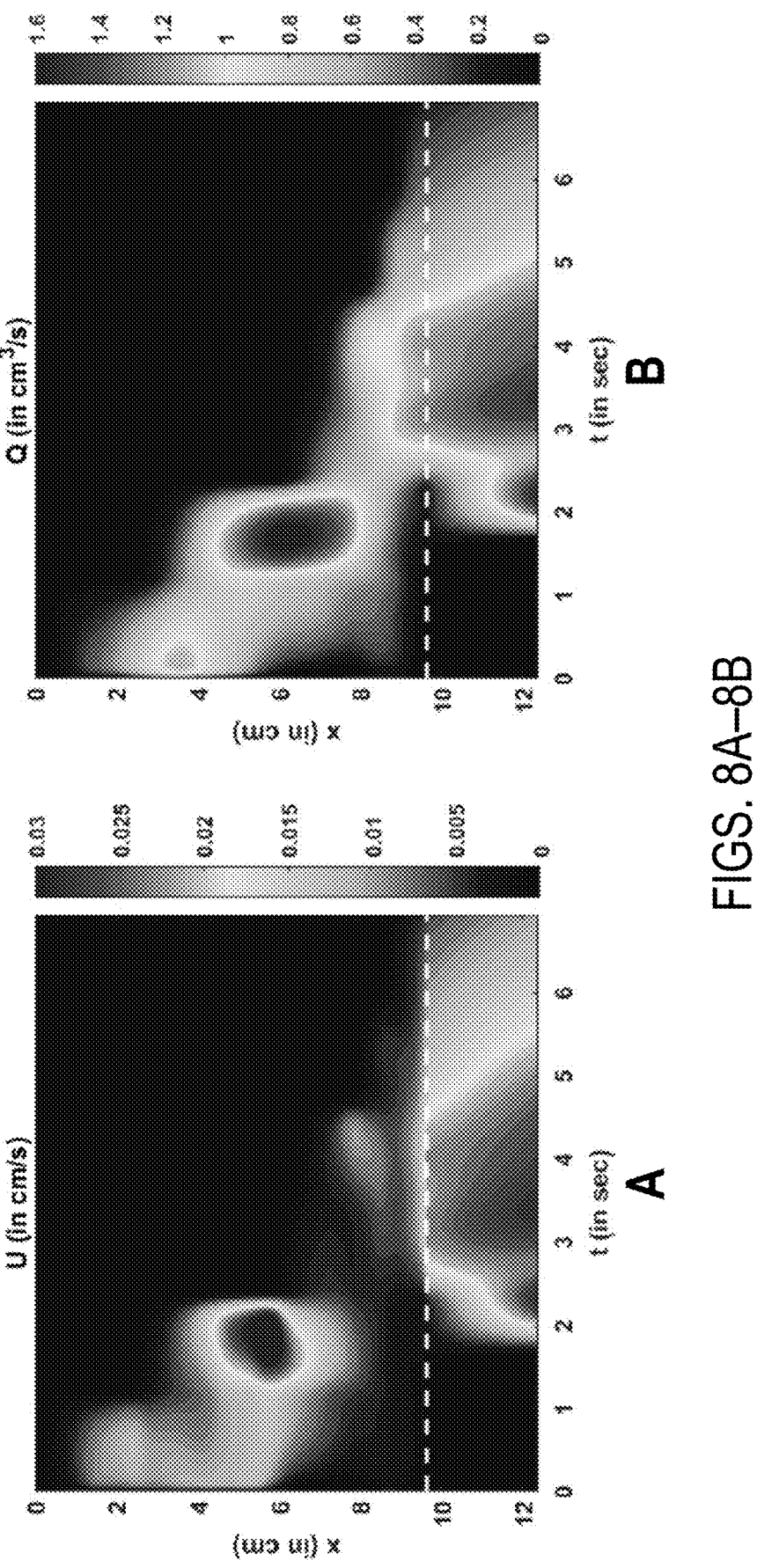
FIGS. 8A-8B illustrate variation of velocity and flow rate.

The cross-sectional areas proximal to the bolus cannot be visualized in MRI because the fluid contrast media was completely displaced by the peristaltic contraction and the dynamic MRI cannot distinguish the esophagus from surrounding tissue. Hence, the inactive cross-sectional area, $A_o$, can be assigned to the esophagus proximal to the bolus. This assignment does not impact the prediction of any of the physical quantities using PINN. This is because the velocity (and flow rate) proximal to the bolus is automatically predicted as zero (as shown in FIGS. 8A and 8B) with this assignment, and since the pressure boundary condition is specified at the distal end, the pressure calculation inside the domain does not depend on the behavior proximal to the bolus. The variation of LES cross-sectional area can be seen below the dashed line in FIG. 7A. The LES cross-sectional area does not vary along x and only varies along t. This is because the constraint as described in Equation 12 has been enforced.

The variation of the LES cross-sectional area is shown more clearly in FIG. 7B. The prediction of $A_{les}$ depends on the reference LES cross-sectional area observed at a single time instant, the conservation laws, and the reference pressure prediction at $\chi_r$. $A_{les}$ has the greatest magnitude near the instant when the LES cross-sectional area was observed in the MRI and has lesser values farther away from that instant. This matches the observation from the MRI images that the LES could not be visualized most of the time. Hence, since the effectiveness of esophageal transport depends on how effectively the esophagus empties, the LES cross-sectional area is an important physiomarker of esophageal function. Greater LES cross-sectional area facilitates esophageal emptying while it is becomes unnecessary for the LES to have large cross-sectional area when the bolus has almost completely emptied. Similar LES behavior can be observed in FIG. 7B where it was greater during the emptying process and minimal when bolus emptying was nearly complete.

The variation of bolus fluid velocity and flow rate are shown in FIGS. 8A and 8B, respectively. It can be seen that there are two major high-velocity zones. The first high-velocity zone is near x=6 cm and t=2 sec. Comparing this region with the FIG. 7A it can be observed that the cross-sectional area at that location and time was less than at its adjacent regions. The second high-velocity zone was in the LES. This corresponds to low cross-sectional area as well. Thus, the velocities are greater at lower cross-sectional areas which is intuitive for low viscosity fluids. The flow rate is the rate at which the bolus is emptied out of the esophagus and zones with high flow rate are similar to those with high-velocity. However, there is a smoother transition of flow rate from the esophageal body to the LES compared to the velocity field. This is because the LES cross-sectional area was much smaller than that of the esophageal body requiring that the fluid velocity needed to increase more to maintain the same flow rate.

Figure 9:
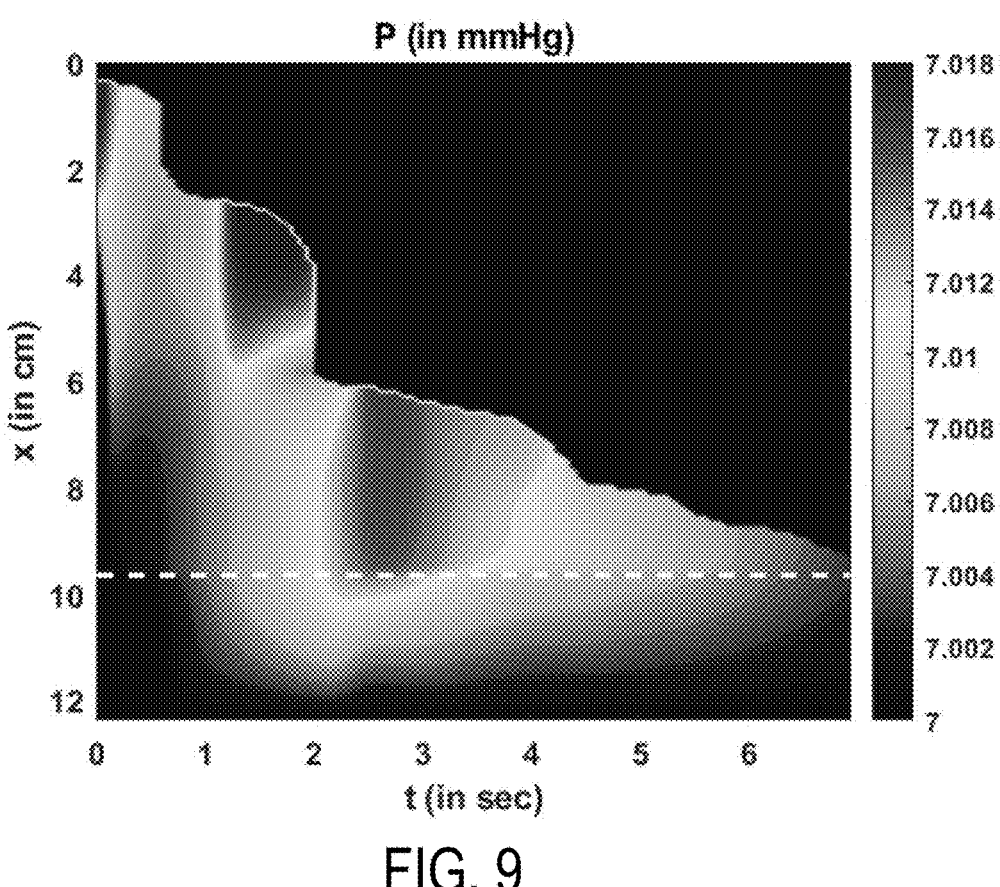
FIG. 9 illustrates variation of pressure as a function of x and t. Two major high-pressure zones can be identified wherein the fluid locally accelerates, making the corresponding fluid velocity greater in those regions. Note that the magnitude of dynamic pressure variations are minimal compared to the total pressure.

The variation of fluid pressure is shown in FIG. 9. The pressure gradients along x drives the fluid through the esophagus. On comparing FIG. 8A and FIG. 9, it can be seen that the high-pressure gradients match the high-velocity zones. This is because the high-pressure gradients locally accelerate the fluid. Note that the pressure variations are minimal compared to the magnitudes of the pressure. An intragastric pressure of 7 mmHg was used as a boundary condition for pressure at the distal end which is in the normal range for a healthy subject. The thoracic pressure was assumed to be 0 mmHg. Thus, the intrabolus pressure should be greater than the intragastric pressure to empty into the stomach. The major portion of this pressure (~7 mmHg) is developed by the elastic distention of the esophageal walls. A small portion of the total intrabolus pressure (~0.01 mmHg) is attributable to the local acceleration or deceleration of the bolus fluid. Since the MRI shows only the movement within an already distended esophagus, the calculated pressure variations are minimal and correspond to local acceleration or deceleration of the fluid.

Esophageal wall stiffness (along with the effect of active relaxation) was estimated by the parameter $K/\theta$. The minimum value of $K/\theta$ corresponds to the lower bound of the effective stiffness of the esophageal walls when distended. Since the cross-sectional area of the esophagus is not visible in MRI, any prediction regarding the stiffness at those locations would be inaccurate. Hence, predictions of wall stiffness can be made at regions where the esophagus is distended (e.g., at the location of the bolus). However, the distended esophageal walls also undergo active relaxation to accommodate an incoming bolus as well as minimize intrabolus pressure. The combined behavior of the passive elastic distention of the esophageal walls and active relaxation is captured by the parameter $K/\theta$.

Figure 10:
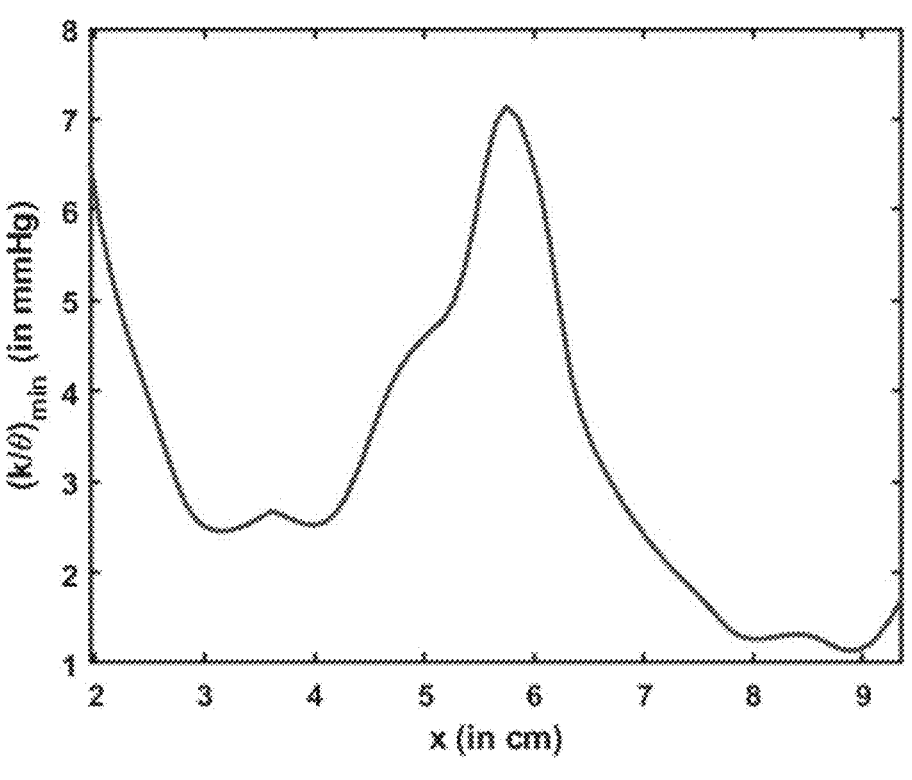
FIG. 10 illustrates variation of the minimum esophageal wall stiffness along the length of the esophagus. This measure of stiffness accounts for active relaxation and captures the wall characteristics when the esophagus was distended. The stiffness is shown only for the esophageal body proximal to the LES.

Since $K/\theta$ as described by Equation 27 estimates the lower bound of the effective esophageal stiffness, the most accurate estimate of $K/\theta$ occurs when the esophageal walls are most distended. The maximum distension corresponds to the minimum value of $K/\theta$, which is shown in FIG. 10. The minimum $K/\theta$ at each x was calculated for all values of t. Note that the high value of $(K/\theta)min$ near x=6 cm in FIG. 10 matches with the low cross-sectional area region in FIG. 7A. This makes sense because the esophagus would distend less at locations of greater stiffness. It should be noted that although the stiffness appears high at x=6 cm, it is does not necessarily mean that the esophageal tissue is stiffer at that location. When the esophageal wall comes in contact with surrounding organs, it appears stiffer due to the effect of those organs on the esophagus.

Figure 11:
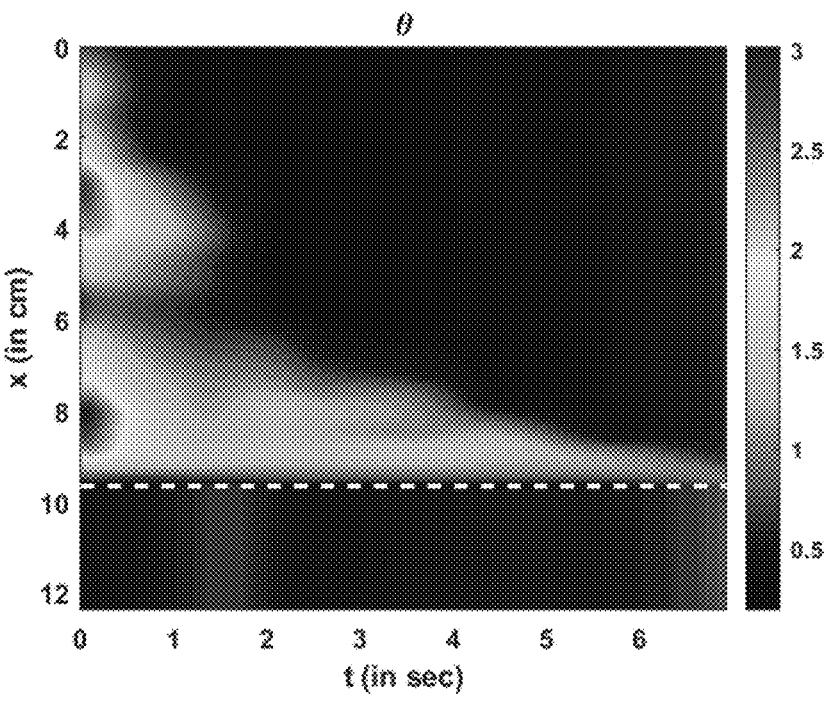
FIG. 11 illustrates variation of active relaxation as a function of x and t. The dashed line corresponds to the proximal end of the LES. Since the tube-law was not specified at the LES, the active relaxation is meaningful only in the esophageal body (above the dashed line).

The parameter θ quantifies the amount of active relaxation of the esophageal walls to facilitate distention, and consequently, decrease the local intrabolus pressure and increase the flow rate. The variation of the active relaxation parameter θ is shown in FIG. 11. As described by Equation 28 and comparing FIG. 11 and FIG. 7A, it can be seen that the locations of the high values of θ match the location of the high values of A, and, similarly lower values of θ match the lower values of A. Note that θ quantifies the active relaxation in the esophageal body and not the LES. Comparing FIG. 10 and FIG. 11 shows that locations of greater stiffness correspond to locations of lower active relaxation and vice-versa. Similar to $(K/\theta)min$ as described above, the impact of tissues and organs outside the esophagus impacts the prediction of θ as well. Hence, the low value of θ near x=6 cm does not necessarily mean a lack of active relaxation, but most likely the influence of structures outside the esophagus. Hence, it is contemplated that the greater values of active relaxation are closer to the actual active relaxation of the esophageal walls.

As noted above, in some implementations, a convolutional neural network ("CNN") such as 3D U-Net can be used to perform semantic segmentation of the bolus geometry based on a limited number of sample 2D slices of the 3D MRI or CT image. 3D U-Net is built on the U-Net, which is composed of a contracting encoder path and an expansive decoder path. A differentiating feature of the 3D U-Net is that instead of operating on the 2D images that the U-Net expects as input, the former operates on volumetric (3D) data. Automatic segmentation using the 3D U-Net is viable due to the repetitiveness of the structures and variations of the input images, especially for volumetric biomedical data.

The network architecture used was that of 3D U-Net, except that the number of channels used was 1, instead of 3. Batch normalization was performed after each convolutional layer to prevent overfitting.

The 3D U-Net was trained using 5 training sets, with each including an image and a mask. The original MRI scans are composed of folders for each time instant, which contain a series of 64 DICOM image files representing each slice. To prepare the training masks, segmentation via manual delineation is performed, where voxels in the images were given a label of 1 if they were determined to be part of a bolus, and 0 if they were not. For the benchmark case, the images were manually segmented with intervals of 2, 4, and 2 slices respectively in the x, y, and z directions. In order to determine the effects of the sparsity of the annotation on the training of the model as well as the accuracy of the prediction, manual segmentations were made on the same set of images using the same method, except with intervals in the x, y, and z directions of (4, 8, 4), (4, 8, 8), in addition to a training set with only one segmentation slice in each direction to represent a more extreme case of sparse annotation. Another image/mask set was used for validation during training, and the 7th set was for testing to compare prediction accuracy among the different cases. The amount of data used in the training of the model is adequate, as in many biomedical volumetric image classification situations, only two images are required to attain reasonable accuracy, along with a weighted loss function and data augmentation.

The original images and masks were of size 160×160×64, but we implemented a cropping procedure along the x-direction such that the eventual inputs to the neural network were of size 160×80×64. This was done in an endeavor to reduce the number of voxels in the input image and thereby reduce processing time, whilst still retaining the area of focus—the esophagus and bolus. Data augmentation was also implemented using techniques such as Gaussian blur, image sharpening, random variation of image brightness, contrast normalization, and elastic deformation.

For the segmentation problem, the weighted Sorensen Dice Coefficient was used to measure the similarity between the predictions and the training set. The weighted dice coefficient loss was used as the loss function during training.

Several hyperparameter tuning trials were conducted to find the optimal hyperparameters and conditions for training the model. Through experimentation, it was found that training for 1000 epochs with an initial learning rate of 10-2 using a learning rate scheduler to decrease the learning rate by a factor of 3 every 250 epochs proved to be the most reliable. The training was conducted using Keras, a high level neural network API of TensorFlow, and the optimization algorithm used was stochastic gradient descent (SGD). A maximum weighted dice coefficient of 0.8575 was attained at epoch 282 during training. The predictions were converted to their binary forms with voxels with values greater than 0.05 classified as 1 (bolus), and those equal to or below 0.05 is set to 0 (background).

Retaining the same hyperparameters, trials were also run with different levels of annotation sparsity. Denoting the number of slices in the x, y, and z directions as (Nx, Ny, Nz), the benchmark trial had (2,4,2), and saw a final validation weighted dice coefficient of 0.7679. The final weighted dice coefficient for the (4,8,8), (4,8,4), and (1,1,1) cases were respectively 0.4608, 0.5289, and 0.3655. Thus, in this trial, the benchmark case of (2,4,2) yielded the highest accuracy.

Figure 12:
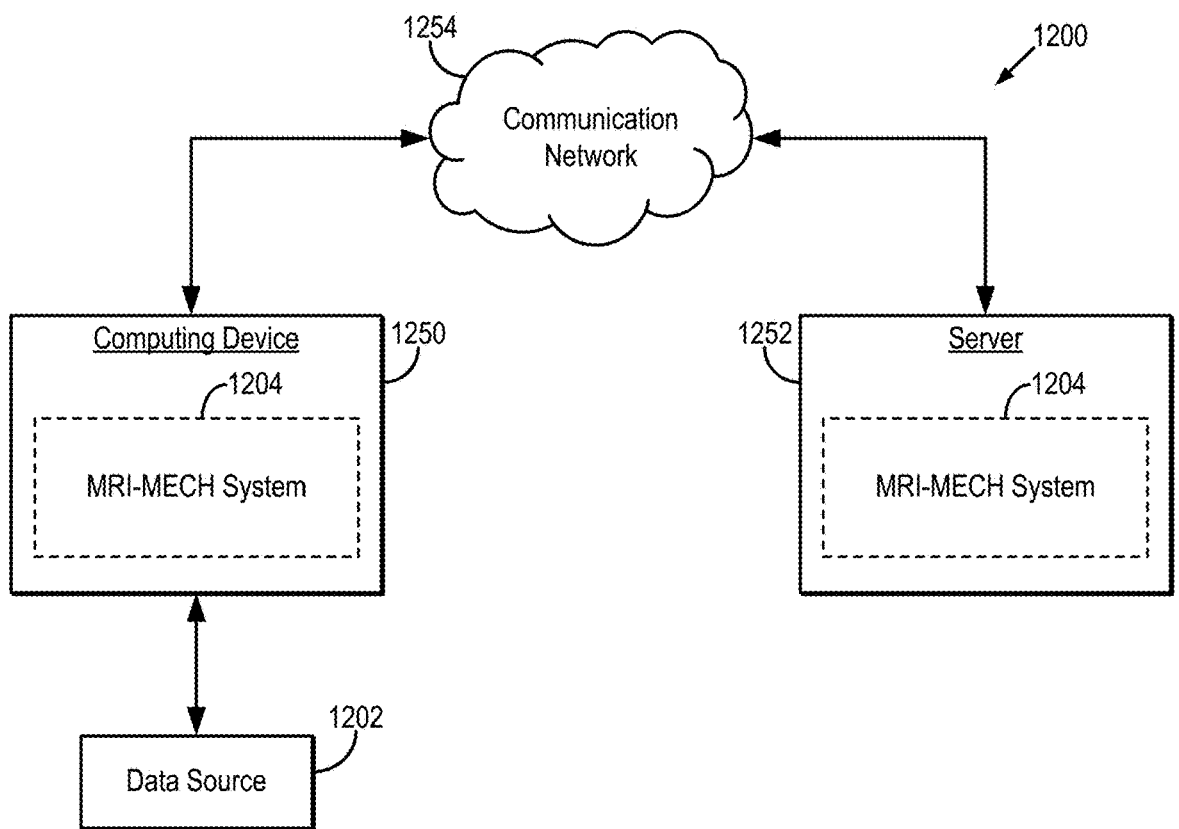
FIG. 12 is a block diagram of an example system for performing a mechanics-informed analysis of medical imaging data using a hybrid computation framework.

Referring now to FIG. 12, an example of a system 1200 for performing a mechanics-informed analysis of medical imaging data using a hybrid computation framework in accordance with some embodiments of the systems and methods described in the present disclosure is shown. As shown in FIG. 12, a computing device 1250 can receive one or more types of data (e.g., medical imaging data) from data source 1202. In some embodiments, computing device 1250 can execute at least a portion of an MRI-MECH system 1204 to generate quantitative bolus and/or esophageal parameter data from medical imaging data received from the data source 1202.

Additionally or alternatively, in some embodiments, the computing device 1250 can communicate information about data received from the data source 1202 to a server 1252 over a communication network 1254, which can execute at least a portion of the MRI-MECH system 1204. In such embodiments, the server 1252 can return information to the computing device 1250 (and/or any other suitable computing device) indicative of an output of the MRI-MECH system 1204.

In some embodiments, computing device 1250 and/or server 1252 can be any suitable computing device or combination of devices, such as a desktop computer, a laptop computer, a smartphone, a tablet computer, a wearable computer, a server computer, a virtual machine being executed by a physical computing device, and so on. The computing device 1250 and/or server 1252 can also reconstruct images from the data.

In some embodiments, data source 1202 can be any suitable source of data (e.g., measurement data, images reconstructed from measurement data, processed image data), such as a medical imaging system (e.g., an MRI system a CT system), another computing device (e.g., a server storing measurement data, images reconstructed from measurement data, processed image data), and so on. In some embodiments, data source 1202 can be local to computing device 1250. For example, data source 1202 can be incorporated with computing device 1250 (e.g., computing device 1250 can be configured as part of a device for measuring, recording, estimating, acquiring, or otherwise collecting or storing data). As another example, data source 1202 can be connected to computing device 1250 by a cable, a direct wireless link, and so on. Additionally or alternatively, in some embodiments, data source 1202 can be located locally and/or remotely from computing device 1250, and can communicate data to computing device 1250 (and/or server 1252) via a communication network (e.g., communication network 1254).

In some embodiments, communication network 1254 can be any suitable communication network or combination of communication networks. For example, communication network 1254 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), other types of wireless network, a wired network, and so on. In some embodiments, communication network 1254 can be a local area network, a wide area network, a public network (e.g., the Internet), a private or semi-private network (e.g., a corporate or university intranet), any other suitable type of network, or any suitable combination of networks. Communications links shown in FIG. 12 can each be any suitable communications link or combination of communications links, such as wired links, fiber optic links, Wi-Fi links, Bluetooth links, cellular links, and so on.

Figure 13:
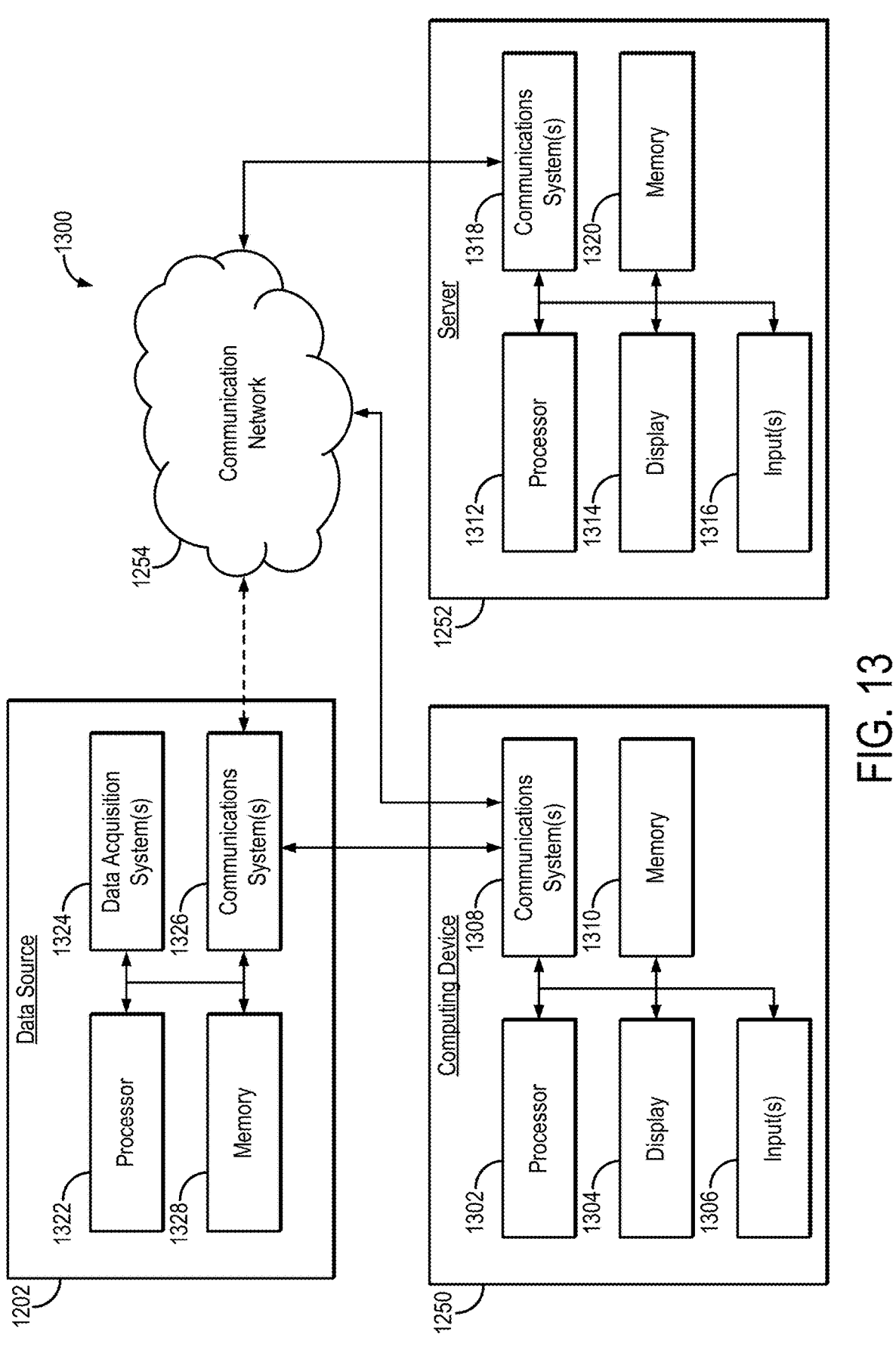
FIG. 13 is a block diagram of example components that can implement the system of FIG. 12.

Referring now to FIG. 13, an example of hardware 1300 that can be used to implement data source 1202, computing device 1250, and server 1252 in accordance with some embodiments of the systems and methods described in the present disclosure is shown.

As shown in FIG. 13, in some embodiments, computing device 1250 can include a processor 1302, a display 1304, one or more inputs 1306, one or more communication systems 1308, and/or memory 1310. In some embodiments, processor 1302 can be any suitable hardware processor or combination of processors, such as a central processing unit ("CPU"), a graphics processing unit ("GPU"), and so on. In some embodiments, display 1304 can include any suitable display devices, such as a liquid crystal display ("LCD") screen, a light-emitting diode ("LED") display, an organic LED ("OLED") display, an electrophoretic display (e.g., an "e-ink" display), a computer monitor, a touchscreen, a television, and so on. In some embodiments, inputs 1306 can include any suitable input devices and/or sensors that can be used to receive user input, such as a keyboard, a mouse, a touchscreen, a microphone, and so on.

In some embodiments, communications systems 1308 can include any suitable hardware, firmware, and/or software for communicating information over communication network 1254 and/or any other suitable communication networks. For example, communications systems 1308 can include one or more transceivers, one or more communication chips and/or chip sets, and so on. In a more particular example, communications systems 1308 can include hardware, firmware, and/or software that can be used to establish a Wi-Fi connection, a Bluetooth connection, a cellular connection, an Ethernet connection, and so on.

In some embodiments, memory 1310 can include any suitable storage device or devices that can be used to store instructions, values, data, or the like, that can be used, for example, by processor 1302 to present content using display 1304, to communicate with server 1252 via communications system(s) 1308, and so on. Memory 1310 can include any suitable volatile memory, non-volatile memory, storage, or any suitable combination thereof. For example, memory 1310 can include random-access memory ("RAM"), read-only memory ("ROM"), electrically programmable ROM ("EPROM"), electrically erasable ROM ("EEPROM"), other forms of volatile memory, other forms of non-volatile memory, one or more forms of semi-volatile memory, one or more flash drives, one or more hard disks, one or more solid state drives, one or more optical drives, and so on. In some embodiments, memory 1310 can have encoded thereon, or otherwise stored therein, a computer program for controlling operation of computing device 1250. In such embodiments, processor 1302 can execute at least a portion of the computer program to present content (e.g., images, user interfaces, graphics, tables), receive content from server 1252, transmit information to server 1252, and so on. For example, the processor 1302 and the memory 1310 can be configured to perform the methods described herein (e.g., the method of FIG. 4; the workflow illustrated in FIG. 2; the PINN illustrated in FIG. 3, and so on).

In some embodiments, server 1252 can include a processor 1312, a display 1314, one or more inputs 1316, one or more communications systems 1318, and/or memory 1320. In some embodiments, processor 1312 can be any suitable hardware processor or combination of processors, such as a CPU, a GPU, and so on. In some embodiments, display 1314 can include any suitable display devices, such as an LCD screen, LED display, OLED display, electrophoretic display, a computer monitor, a touchscreen, a television, and so on. In some embodiments, inputs 1316 can include any suitable input devices and/or sensors that can be used to receive user input, such as a keyboard, a mouse, a touchscreen, a microphone, and so on.

In some embodiments, communications systems 1318 can include any suitable hardware, firmware, and/or software for communicating information over communication network 1254 and/or any other suitable communication networks. For example, communications systems 1318 can include one or more transceivers, one or more communication chips and/or chip sets, and so on. In a more particular example, communications systems 1318 can include hardware, firmware, and/or software that can be used to establish a Wi-Fi connection, a Bluetooth connection, a cellular connection, an Ethernet connection, and so on.

In some embodiments, memory 1320 can include any suitable storage device or devices that can be used to store instructions, values, data, or the like, that can be used, for example, by processor 1312 to present content using display 1314, to communicate with one or more computing devices 1250, and so on. Memory 1320 can include any suitable volatile memory, non-volatile memory, storage, or any suitable combination thereof. For example, memory 1320 can include RAM, ROM, EPROM, EEPROM, other types of volatile memory, other types of non-volatile memory, one or more types of semi-volatile memory, one or more flash drives, one or more hard disks, one or more solid state drives, one or more optical drives, and so on. In some embodiments, memory 1320 can have encoded thereon a server program for controlling operation of server 1252. In such embodiments, processor 1312 can execute at least a portion of the server program to transmit information and/or content (e.g., data, images, a user interface) to one or more computing devices 1250, receive information and/or content from one or more computing devices 1250, receive instructions from one or more devices (e.g., a personal computer, a laptop computer, a tablet computer, a smartphone), and so on.

In some embodiments, the server 1252 is configured to perform the methods described in the present disclosure. For example, the processor 1312 and memory 1320 can be configured to perform the methods described herein (e.g., the method of FIG. 4; the workflow illustrated in FIG. 2; the PINN illustrated in FIG. 3, and so on).

In some embodiments, data source 1202 can include a processor 1322, one or more data acquisition systems 1324, one or more communications systems 1326, and/or memory 1328. In some embodiments, processor 1322 can be any suitable hardware processor or combination of processors, such as a CPU, a GPU, and so on. In some embodiments, the one or more data acquisition systems 1324 are generally configured to acquire data, images, or both, and can include a medical imaging system such as an MRI system and/or a CT system. Additionally or alternatively, in some embodiments, the one or more data acquisition systems 1324 can include any suitable hardware, firmware, and/or software for coupling to and/or controlling operations of a medical imaging system, such as an MRI system or a CT system. In some embodiments, one or more portions of the data acquisition system(s) 1324 can be removable and/or replaceable.

Note that, although not shown, data source 1202 can include any suitable inputs and/or outputs. For example, data source 1202 can include input devices and/or sensors that can be used to receive user input, such as a keyboard, a mouse, a touchscreen, a microphone, a trackpad, a trackball, and so on. As another example, data source 1202 can include any suitable display devices, such as an LCD screen, an LED display, an OLED display, an electrophoretic display, a computer monitor, a touchscreen, a television, etc., one or more speakers, and so on.

In some embodiments, communications systems 1326 can include any suitable hardware, firmware, and/or software for communicating information to computing device 1250 (and, in some embodiments, over communication network 1254 and/or any other suitable communication networks). For example, communications systems 1326 can include one or more transceivers, one or more communication chips and/or chip sets, and so on. In a more particular example, communications systems 1326 can include hardware, firmware, and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 1328 can include any suitable storage device or devices that can be used to store instructions, values, data, or the like, that can be used, for example, by processor 1322 to control the one or more data acquisition systems 1324, and/or receive data from the one or more data acquisition systems 1324; to generate images from data; present content (e.g., data, images, a user interface) using a display; communicate with one or more computing devices 1250; and so on. Memory 1328 can include any suitable volatile memory, non-volatile memory, storage, or any suitable combination thereof. For example, memory 1328 can include RAM, ROM, EPROM, EEPROM, other types of volatile memory, other types of non-volatile memory, one or more types of semi-volatile memory, one or more flash drives, one or more hard disks, one or more solid state drives, one or more optical drives, and so on. In some embodiments, memory 1328 can have encoded thereon, or otherwise stored therein, a program for controlling operation of data source 1202. In such embodiments, processor 1322 can execute at least a portion of the program to generate images, transmit information and/or content (e.g., data, images, a user interface) to one or more computing devices 1250, receive information and/or content from one or more computing devices 1250, receive instructions from one or more devices (e.g., a personal computer, a laptop computer, a tablet computer, a smartphone, etc.), and so on.

In some embodiments, any suitable computer-readable media can be used for storing instructions for performing the functions and/or processes described herein. For example, in some embodiments, computer-readable media can be transitory or non-transitory. For example, non-transitory computer-readable media can include media such as magnetic media (e.g., hard disks, floppy disks), optical media (e.g., compact discs, digital video discs, Blu-ray discs), semiconductor media (e.g., RAM, flash memory, EPROM, EEPROM), any suitable media that is not fleeting or devoid of any semblance of permanence during transmission, and/or any suitable tangible media. As another example, transitory computer-readable media can include signals on networks, in wires, conductors, optical fibers, circuits, or any suitable media that is fleeting and devoid of any semblance of permanence during transmission, and/or any suitable intangible media.

As used herein in the context of computer implementation, unless otherwise specified or limited, the terms "component," "system," "module," "framework," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

The present disclosure has described one or more preferred embodiments, and it should be appreciated that many equivalents, alternatives, variations, and modifications, aside from those expressly stated, are possible and within the scope of the invention.

The invention claimed is:

1. A method for analyzing flow through a tubular organ of a subject, the method comprising:

(a) accessing, with a computer system, medical imaging data acquired from the subject, the medical image data depicting transport of a bolus through a tubular organ of the subject;

(b) generating segmented medical imaging data with the computer system by segmenting the medical imaging data in order to segment the bolus as it is transported through the tubular organ of the subject;

(c) computing, with the computer system from the segmented medical imaging data, spatiotemporal parameters associated with the bolus as it is transported through the tubular organ of the subject;

(d) accessing with the computer system a machine learning model that has been trained to estimate quantitative flow analysis parameter data from spatiotemporal parameters associated with a bolus transport;

(e) generating quantitative flow analysis parameter data by inputting the spatiotemporal parameter data to the machine learning model using the computer system, generating output data as the quantitative flow analysis data; and (f) presenting the quantitative flow analysis parameter data to a user.

2. The method of claim 1, wherein the quantitative flow analysis parameter data comprise at least one of cross-section areas of the tubular organ, fluid velocity of the bolus, or fluid pressure of the bolus.

3. The method of claim 2, wherein the quantitative flow analysis parameter data comprise cross-section areas of the tubular organ, fluid velocity of the bolus, and fluid pressure of the bolus.

4. The method of claim 1, wherein the spatiotemporal parameter data comprise spatial position along the bolus and time.

5. The method of claim 1, wherein generating the segmented medical imaging data comprises inputting the medical imaging data to a trained machine learning algorithm, generating output data as the segmented medical image data, wherein the trained machine learning algorithm has been trained on training data to identify and segment a bolus from background image data.

6. The method of claim 5, wherein the trained machine learning algorithm implements an artificial neural network.

7. The method of claim 6, wherein the artificial neural network is a convolutional neural network having a 3D U-Net architecture.

8. The method of claim 1, wherein the machine learning model comprises a physics-informed neural network (PINN).

9. The method of claim 8, wherein the PINN is based on a one-dimensional fluid mechanics-based model.

10. The method of claim 1, wherein the tubular organ is an esophagus.

11. The method of claim 1, wherein the medical imaging data comprise magnetic resonance images.

12. The method of claim 1, wherein the medical imaging data comprise computed tomography (CT) images.

13. The method of claim 1, wherein the tubular organ is an esophagus and further comprising computing at least one of an esophageal wall stiffness or an active relaxation from the quantitative flow analysis parameter data.

14. The method of claim 13, further comprising generating a report that quantifies esophageal function based on the quantitative flow analysis parameter data and at least one of esophageal wall stiffness or active relaxation.

* * * * *